United States Patent
Yamaguchi et al.

(10) Patent No.: US 6,500,485 B1
(45) Date of Patent: *Dec. 31, 2002

(54) COLOR FILTER MANUFACTURING METHOD AND APPARATUS, COLOR FILTER, DISPLAY DEVICE, AND APPARATUS HAVING DISPLAY DEVICE

(75) Inventors: Nobuhito Yamaguchi, Inagi (JP); Hiroshi Fujiike, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/797,711

(22) Filed: Feb. 11, 1997

(30) Foreign Application Priority Data

Feb. 16, 1996 (JP) ............................................. 8-029490
Dec. 20, 1996 (JP) ............................................. 8-341352

(51) Int. Cl.⁷ ............................................. B05D 5/06
(52) U.S. Cl. .................. 427/162; 427/165; 427/256; 347/1; 345/88
(58) Field of Search .................. 345/88; 347/1; 427/162, 165, 244, 256

(56) References Cited

U.S. PATENT DOCUMENTS

| | | | |
|---|---|---|---|
| 4,313,124 A | 1/1982 | Hara | 346/140 R |
| 4,345,262 A | 8/1982 | Shirato et al. | 346/140 R |
| 4,459,600 A | 7/1984 | Sato et al. | 346/140 R |
| 4,463,359 A | 7/1984 | Ayata et al. | 346/1.1 |
| 4,558,333 A | 12/1985 | Sugitani et al. | 346/140 R |
| 4,608,577 A | 8/1986 | Hori | 346/140 R |
| 4,723,129 A | 2/1988 | Endo et al. | 346/1.1 |
| 4,740,796 A | 4/1988 | Endo et al. | 346/1.1 |
| 5,552,192 A | * 9/1996 | Kashiwazaki et al. | 427/165 X |
| 5,670,205 A | * 9/1997 | Miyazati et al. | 427/162 X |
| 5,714,195 A | * 2/1998 | Shiha et al. | 427/162 X |
| 6,145,981 A | * 11/2000 | Akahira et al. | 347/107 |

FOREIGN PATENT DOCUMENTS

| | | |
|---|---|---|
| EP | 0 376 596 | * 7/1990 |
| EP | 0 526 233 A2 | 2/1993 |
| EP | 0 675 385 | * 10/1995 |
| EP | 0 756 932 A2 | 2/1997 |
| JP | 54-56847 | 5/1979 |
| JP | 59-75205 | 4/1984 |
| JP | 59-123670 | 7/1984 |
| JP | 59-138461 | 8/1984 |
| JP | 60-71260 | 4/1985 |
| JP | 63-235901 | 9/1988 |
| JP | 1-217320 | 8/1989 |
| JP | 08-271724 | 10/1996 |
| WO | WO 95/21400 | 8/1995 |

* cited by examiner

Primary Examiner—Janyce Bell
Assistant Examiner—Michael Cleveland
(74) Attorney, Agent, or Firm—Fitzpatrick, Cella, Harper & Scinto

(57) ABSTRACT

A color filter manufacturing method manufactures a high-quality color filter by greatly reducing color irregularity in the respective pixels. This is accomplished by manufacturing a color filter by coloring each pixel with a plurality of discharged inks arrayed in the scanning direction while relatively scanning an ink-jet head over a substrate a plurality of times, wherein a coloring operation is performed by changing the discharging positions of inks onto the respective pixels in at least one of a plurality of scanning operations are changed with respect to those in other scanning operations.

8 Claims, 21 Drawing Sheets

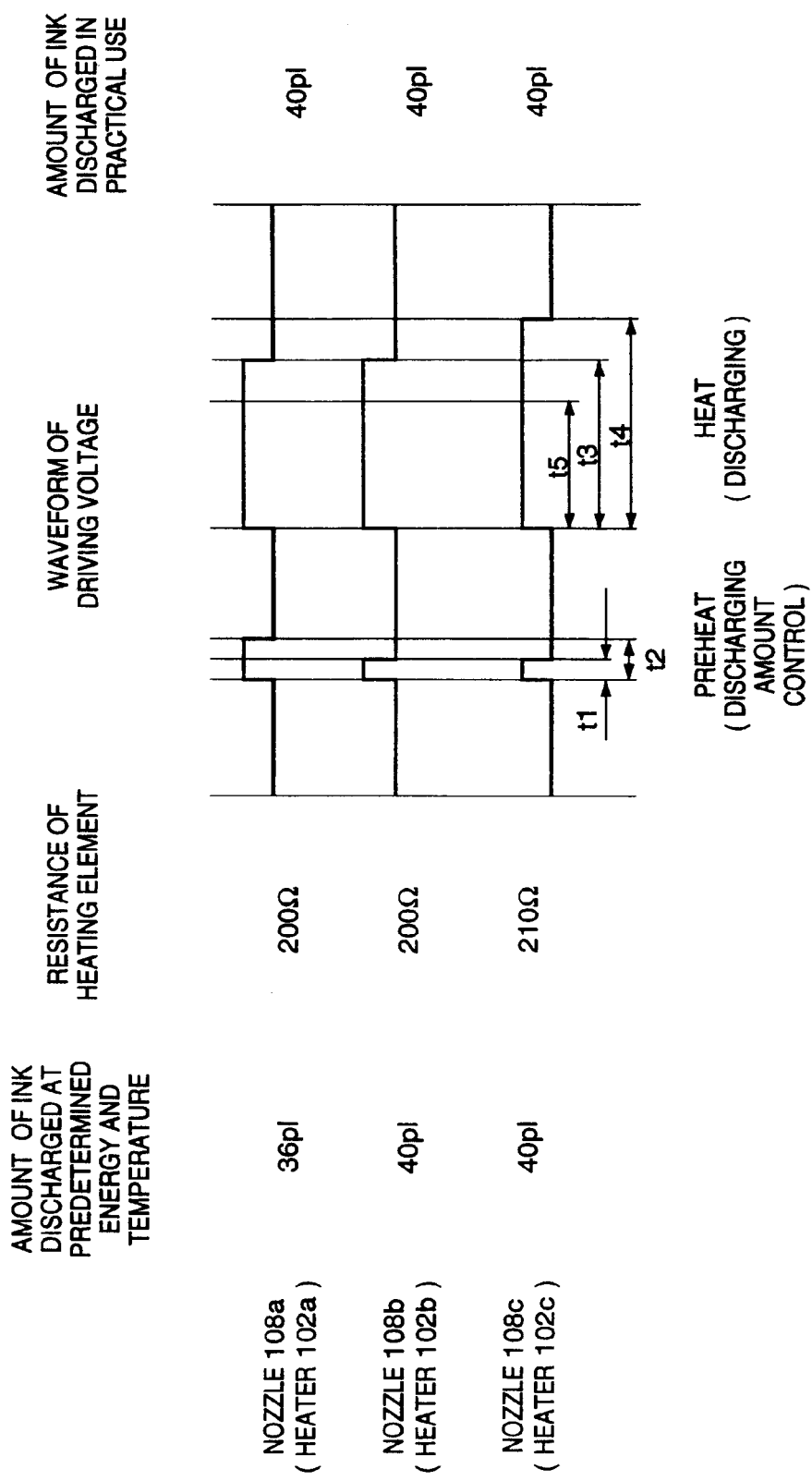

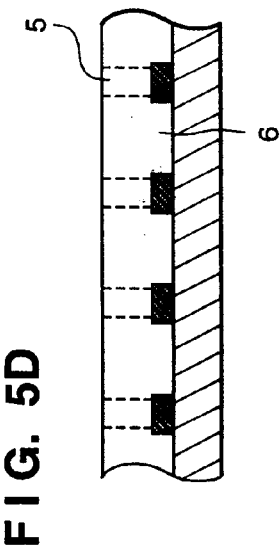
FIG. 5A
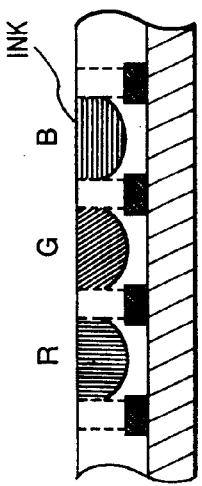
FIG. 5B
FIG. 5C
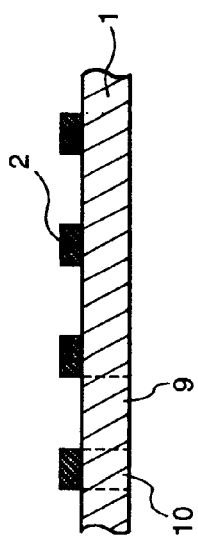
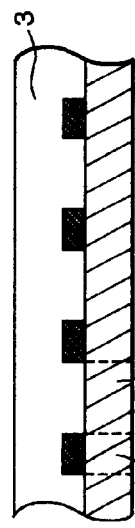
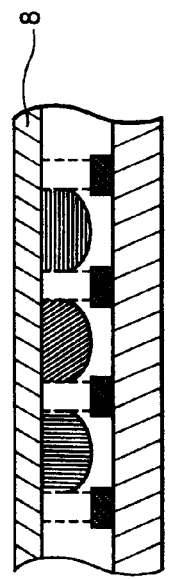
FIG. 5D
FIG. 5E
FIG. 5F
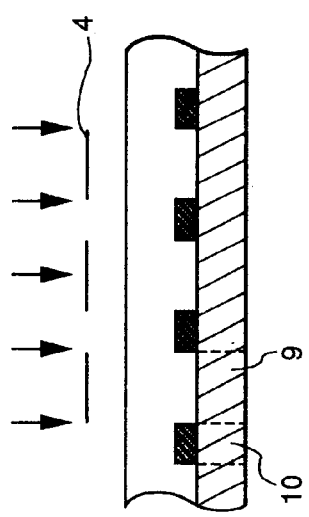

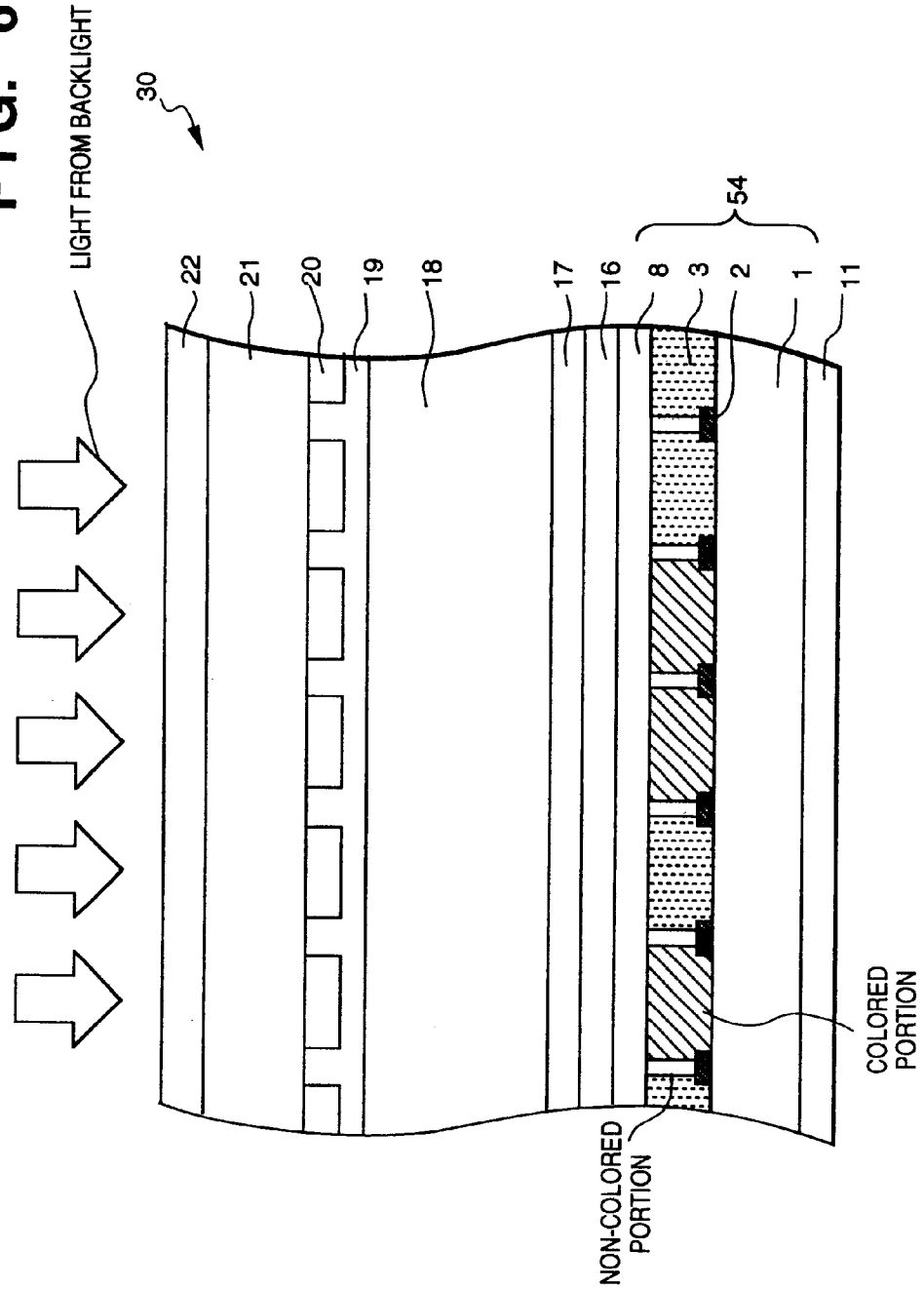

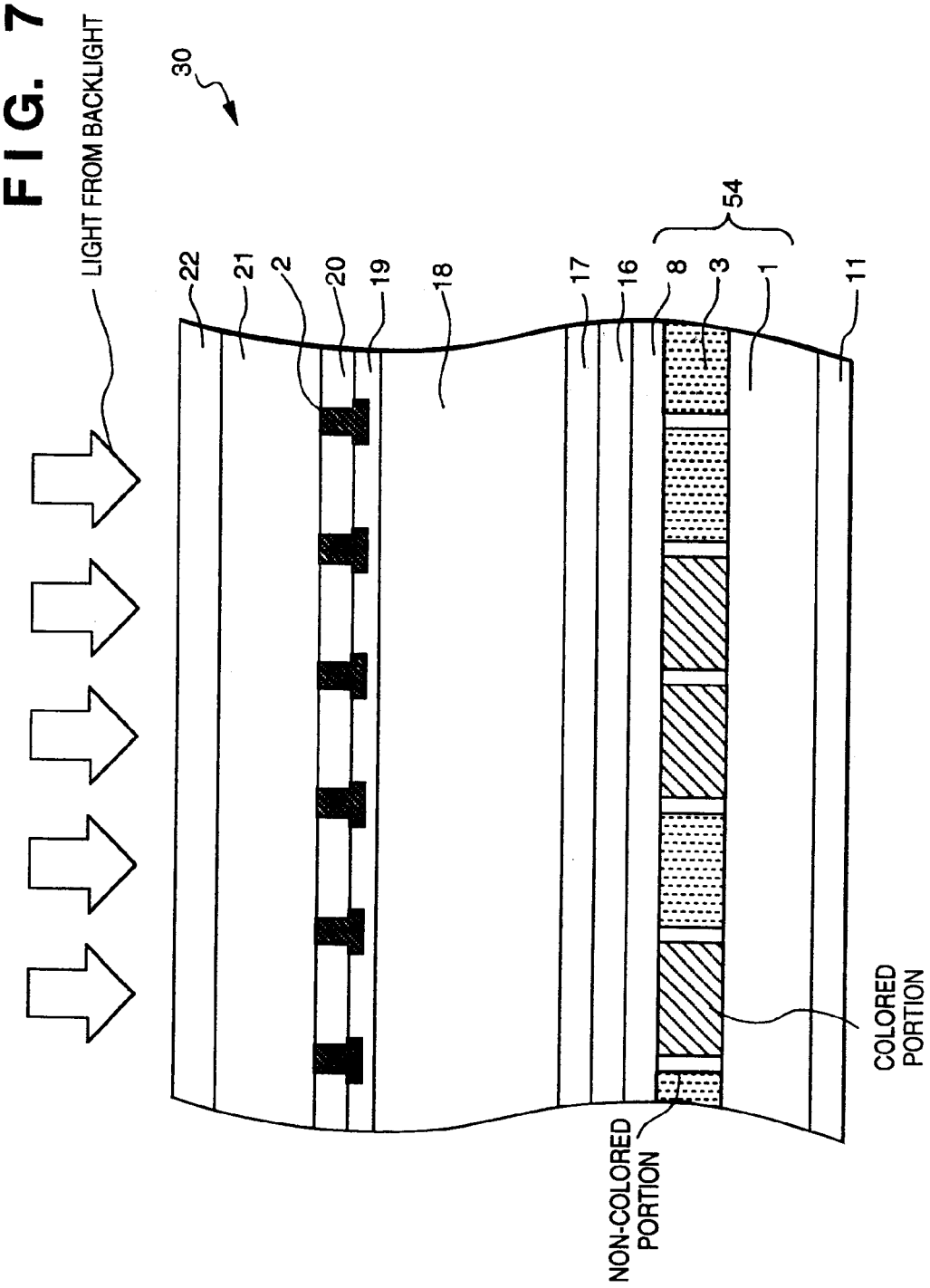

MEASUREMENT RESULT
OF VARIATIONS IN AMOUNT
OF INK DISCHARGED

NOZZLE 1  −10%
NOZZLE 2  +20%
NOZZLE 3  ±0%

PRINTING PATTERN DATA 10000000001000000001000000001000000
10000000001000000001000000001000000
10000000001000000001000000001000000

10 TIMES

COLOR FILTER MANUFACTURING METHOD AND APPARATUS, COLOR FILTER, DISPLAY DEVICE, AND APPARATUS HAVING DISPLAY DEVICE

BACKGROUND OF THE INVENTION

1. Field of the Invention

The present invention relates to a color filter manufacturing method and apparatus for manufacturing a color filter by discharging inks onto a substrate using ink-jet heads and coloring each pixel of the color filter, a color filter, a display device, and an apparatus having the display device.

2. Description of the Related Art

With recent advances in personal computers, especially portable personal computers, the demand tends to arise for liquid crystal displays, especially color liquid crystal displays. However, in order to further popularize the use of liquid crystal displays, a reduction in cost must be achieved. Especially, it is required to reduce the cost of a color filter which occupies a large proportion of the total cost. Various methods have been tried to satisfy the required characteristics of color filters while meeting the above requirements. However, any method capable of satisfying all the requirements has not been established. The respective methods will be described below.

The first method is a pigment dispersion method, which is currently replacing a dyeing method. In this method, a pigment-dispersed photosensitive resin layer is formed on a substrate and patterned into a single-color pattern. This process is repeated three times to obtain R, G, and B color filter layers.

The second method is the dyeing method. In the dyeing method, a water-soluble polymer material as a dyeable material is coated on a glass substrate, and the coating is patterned into a desired shape by a photolithography process. The obtained pattern is dipped in a dye bath to obtain a colored pattern. This process is repeated three times to form R, G, and B color filter layers.

The third method is an electrodeposition method. In this method, a transparent electrode is patterned on a substrate, and the resultant structure is dipped in an electrodeposition coating fluid containing a pigment, a resin, an electrolyte, and the like to be colored in the first color by electrodeposition. This process is repeated three times to form R, G, and B color filter layers. Finally, these layers are calcined.

The fourth method is a print method. In this method, a pigment is dispersed in a thermosetting resin, a print operation is performed three times to form R, G, and B coatings separately, and the resins are thermoset, thereby forming colored layers. In either of the above methods, a protective layer is generally formed on the colored layers.

The point common to these methods is that the same process must be repeated three times to obtain layers colored in three colors, i.e., R, G, and B. This causes an increase in cost. In addition, as the number of processes increases, the yield decreases. In the electrodeposition method, limitations are imposed on pattern shapes which can be formed. For this reason, with the existing techniques, it is difficult to apply this method to TFTs. In the print method, a pattern with a fine pitch is difficult to form because of poor resolution and poor evenness.

In order to eliminate these drawbacks, methods of manufacturing color filters by an ink-jet system are disclosed in Japanese Patent Laid-Open Nos. 59-75205, 63-235901, and 1-217320. In these methods, coloring solutions containing coloring agents of three colors, i.e., R (red), G (green), and B (blue), are sprayed on a transparent substrate by an ink-jet system, and the respective coloring solutions are dried to form colored image portions. In such an ink-jet system, R, G, and B filter elements (pixels) can be formed at once, allowing great simplification of the manufacturing process and a great reduction in cost.

In a color filter used for a general liquid crystal display device or the like, the opening portions (i.e., pixels) of the black matrix which partition off the respective pixels are rectangular, whereas the shapes of inks discharged from ink-jet heads are almost spherical. It is therefore difficult to discharge a required amount of ink for one pixel at once and uniformly spread the ink over the entire opening portion of the black matrix. For this reason, a plurality of inks are discharged onto each pixel while the ink-jet head is scanned with respect to the substrate, thereby coloring each pixel. In this case, if a plurality of inks are simply discharged into each pixel by one scanning operation, the respective pixels are difficult to color uniformly.

SUMMARY OF THE INVENTION

The present invention has been, therefore, made in consideration of the above problems, and has as its object to provide a color filter manufacturing method and apparatus which can manufacture a high-quality color filter by greatly reducing color irregularity in the respective pixels.

It is another object of the present invention to provide a color filter manufactured by the above manufacturing method and apparatus, a display device using the color filter, and an apparatus having the display device.

In order to solve the above problems and achieve the above objects, according to the present invention, there is provided a method of manufacturing a color filter by coloring each pixel with a plurality of discharged inks arrayed in a scanning direction while relatively scanning an ink-jet head over a substrate a plurality of numbers of times, comprising performing a coloring operation while changing discharging positions of inks onto the respective pixels in at least one of a plurality of scanning operations with respect to those in other scanning operations.

According to the present invention, there is provided an apparatus for manufacturing a color filter by coloring each pixel with a plurality of discharged inks arrayed in a scanning direction while relatively scanning an ink-jet head over a substrate a plurality of numbers of times, comprising control means for controlling the ink-jet head to perform a coloring operation while changing discharging positions of inks onto the respective pixels in at least one of a plurality of scanning operations with respect to those in other scanning operations.

In addition, according to the present invention, there is provided a color filter manufactured by coloring each pixel with a plurality of discharged inks arrayed in a scanning direction while relatively scanning an ink-jet head over a substrate a plurality of numbers of times, wherein a coloring operation is performed while discharging positions of inks onto the respective pixels in at least one of a plurality of scanning operations are changed with respect to those in other scanning operations.

Furthermore, according to the present invention, there is provided a display device having a color filter manufactured by coloring each pixel with a plurality of discharged inks arrayed in a scanning direction while relatively scanning an ink-jet head over a substrate a plurality of numbers of times, integrally comprising a color filter colored by changing discharging positions of inks onto the respective pixels in at least one of a plurality of scanning operations with respect to those in other scanning operations, and light amount changing means for changing a light amount.

According to the present invention, there is provided an apparatus including a display device having a color filter manufactured by coloring each pixel with a plurality of discharged inks arrayed in a scanning direction while relatively scanning an ink-jet head over a substrate a plurality of numbers of times, integrally comprising a display device integrally including a color filter colored by changing discharging positions of inks onto the respective pixels in at least one of a plurality of scanning operations with respect to those in other scanning operations, and light amount changing means for changing a light amount, and image signal supply means for supplying an image signal to the display device.

Other objects and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIG. 4 is a view for explaining a method of controlling the amounts of inks discharged by changing power supplied to heaters;

FIGS. 5A, 5B, 5C, 5D, 5E and 5F are sectional views showing the steps in manufacturing a color filter;

FIG. 6 is a sectional view showing the basic structure of a color liquid crystal display device incorporating a color filter according to an embodiment of the present invention;

FIG. 7 is a sectional view showing the basic structure of a color liquid crystal display device incorporating a color filter according to another embodiment of the present invention;

DETAILED DESCRIPTION OF THE PREFERRED EMBODIMENTS

The preferred embodiments of the present invention will be described in detail below with reference to the accompanying drawings.

Figure 1:
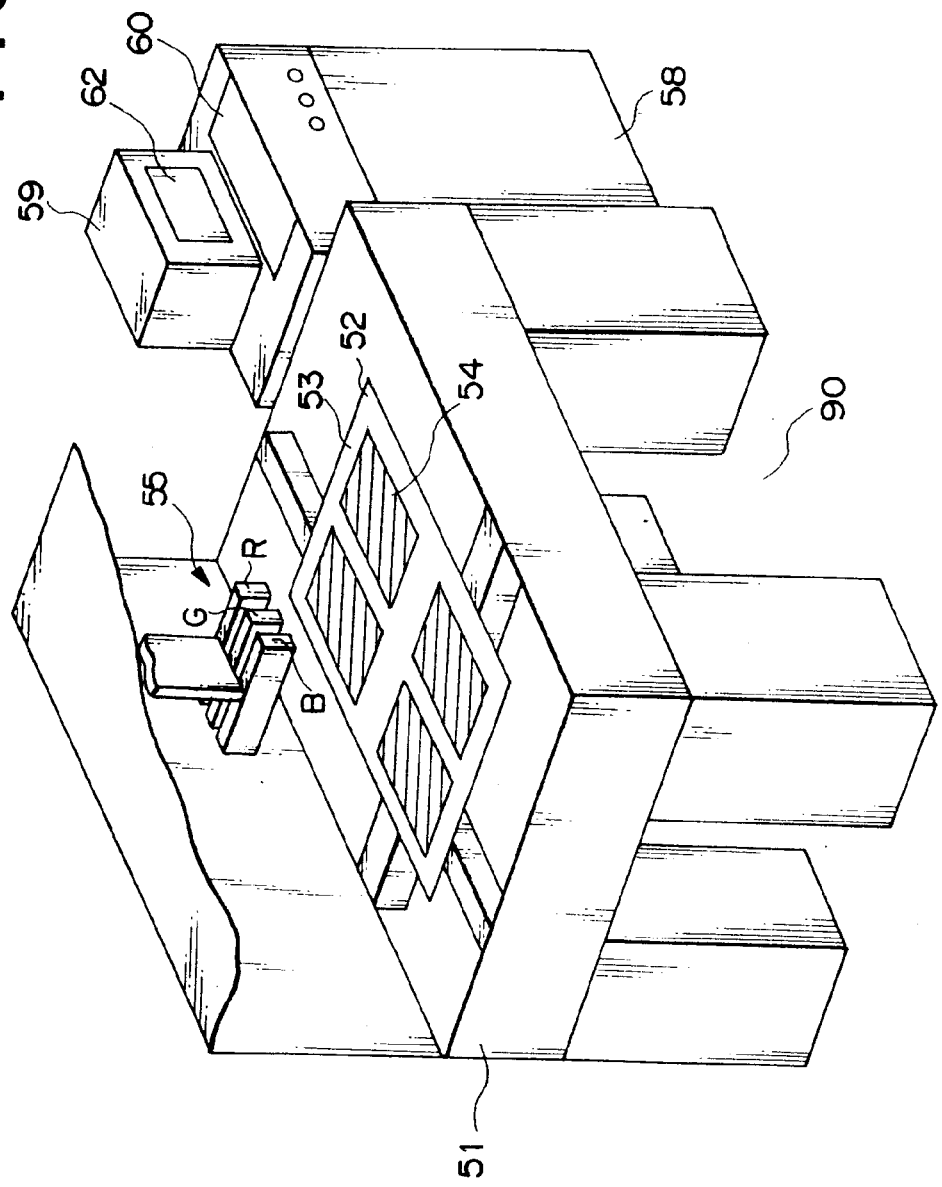
FIG. 1 is a perspective view showing the schematic arrangement of a color filter manufacturing apparatus according to an embodiment of the present invention.

FIG. 1 is a schematic view showing the arrangement of a color filter manufacturing apparatus according to an embodiment of the present invention.

Referring to FIG. 1, reference numeral 51 denotes an apparatus base; 52, an X-Y-θ stage disposed on the apparatus base 51; 53, a color filter substrate set on the X-Y-θ stage 52; 54, color filters formed on the color filter substrate 53; 55, R (red), G (green), and B (blue) ink-jet heads for coloring the color filters 54; 58, a controller for controlling the overall operation of a color filter manufacturing apparatus 90; 59, a teaching pendant (personal computer) as the display unit of the controller; and 60, a keyboard as the operation unit of the teaching pendant 59.

Figure 2:
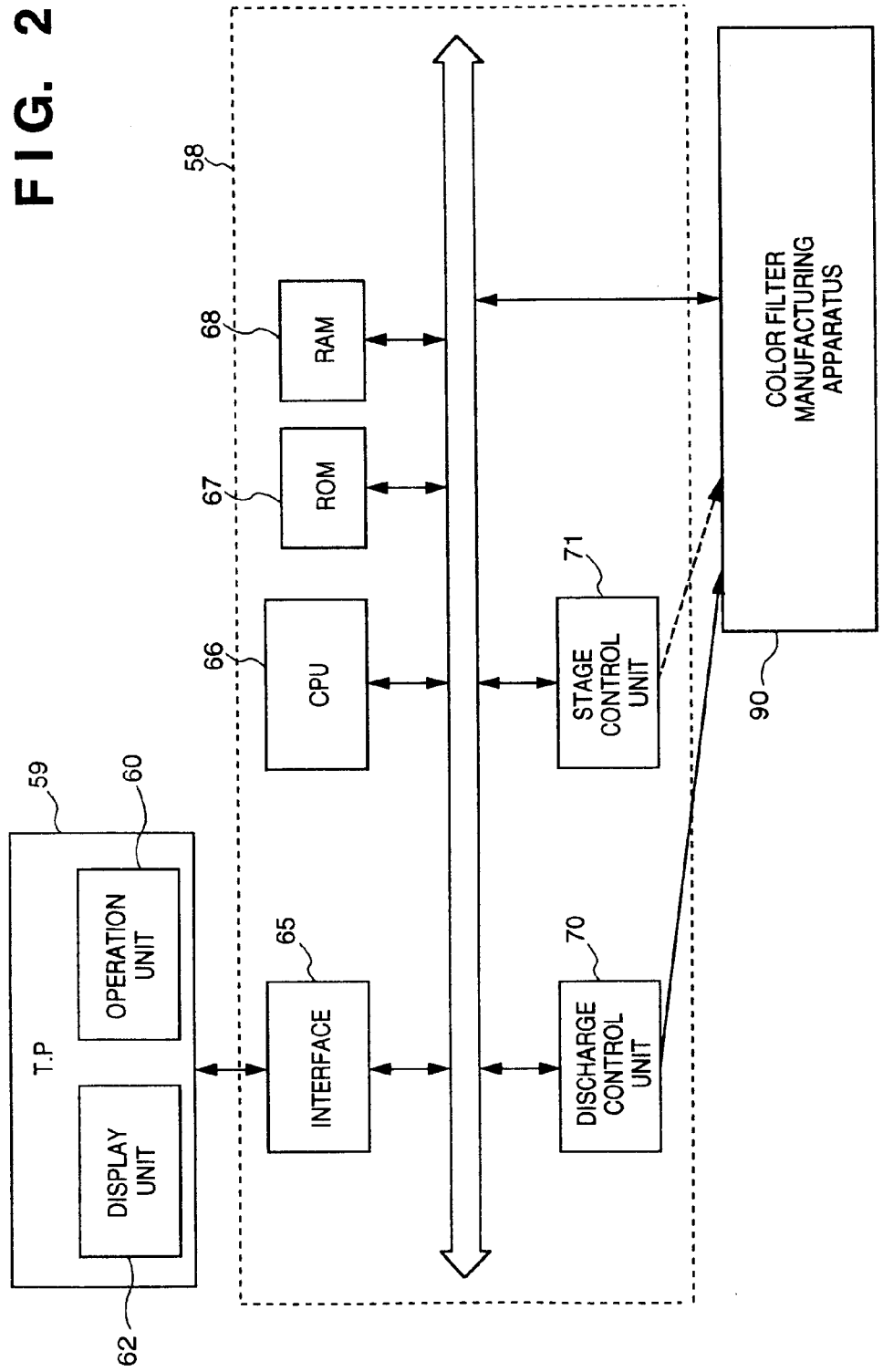
FIG. 2 is a block diagram showing the arrangement of a control unit for controlling the operation of the color filter manufacturing apparatus.

FIG. 2 is a block diagram showing the arrangement of the controller of the color filter manufacturing apparatus 90. The teaching pendant 59 serves as the input/output means of the controller 58. Reference numeral 62 denotes a display unit for displaying how a manufacturing process progresses, information indicating the presence/absence of a head abnormality, and the like. The keyboard 60 designates an operation of the color filter manufacturing apparatus 90 and the like.

The controller 58 controls the overall operation of the color filter manufacturing apparatus 90. Reference numeral 65 denotes an interface for exchanging data with the teaching pendant 59; 66, a CPU for controlling the color filter manufacturing apparatus 90; 67, a ROM storing control programs for operating the CPU 66; 68, a RAM for storing abnormality information and the like; 70, a discharge control unit for controlling discharging of an ink into each pixel of a color filter; and 71, a stage control unit for controlling the operation of the X-Y-θ stage 52 of the color filter manufacturing apparatus 90. The color filter manufacturing apparatus 90 is connected to the controller 58 and operates in accordance with instructions therefrom.

Figure 3:
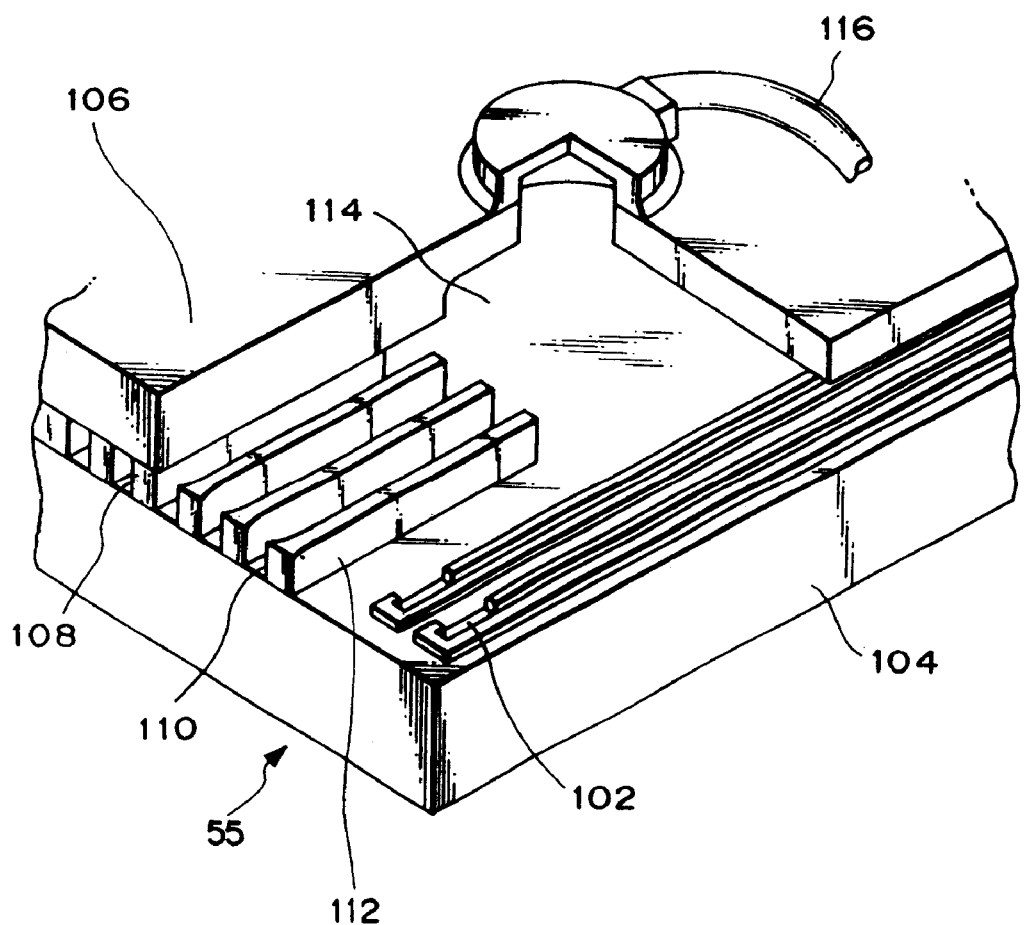
FIG. 3 is a perspective view showing the structure of an ink-jet head used for the color filter manufacturing apparatus.

FIG. 3 shows the structure of the ink-jet head 55 used in the color filter manufacturing apparatus 90. Referring to FIG. 1, three ink-jet heads are arranged in correspondence with three colors, i.e., R, G, and B. Since these three heads have the same structure, FIG. 3 shows the structure of one of the three heads as a representative.

Referring to FIG. 3, the ink-jet head 55 mainly comprises a heater board 104 as a board on which a plurality of heaters 102 for heating an ink are formed, and a ceiling plate 106 mounted on the heater board 104. A plurality of discharging openings 108 are formed in the ceiling plate 106. Tunnel-like fluid passages 110 communicating with the discharging openings 108 are formed therebehind. The respective fluid passages 110 are isolated from the adjacent fluid passages via partition walls 112. The respective fluid passages 110 are commonly connected to one ink chamber 114 at the rear side of the fluid passages. An ink is supplied to the ink chamber 114 via an ink inlet 116. This ink is supplied from the ink chamber 114 to each fluid passage 110.

The heater board 104 and the ceiling plate 106 are positioned such that the position of each heater 102 coincides with that of a corresponding fluid passage 110, and are assembled into the state shown in FIG. 3. Although FIG. 3 shows only two heaters 102, the heater 102 is arranged in correspondence with each fluid passage 110. When a predetermined driving signal is supplied to the heater 102 in the assembled state shown in FIG. 3, an ink above the heater 102 is boiled to produce a bubble, and the ink is pushed and discharged from the discharging opening 108 upon volume expansion of the ink. Therefore, the size of a bubble can be adjusted by controlling a driving pulse applied to the heater 102, e.g., controlling the magnitude of power. That is, the volume of the ink discharged from each discharging opening can be arbitrarily controlled.

FIG. 4 is a timing chart for explaining a method of controlling the amount of ink discharged by changing power supplied to each heater in this manner.

In this embodiment, two types of constant-voltage pulses are applied to each heater 102 to adjust the amount of ink discharged. The two pulses are a preheat pulse and a main heat pulse (to be simply referred to as a heat pulse hereinafter), as shown in FIG. 4. The preheat pulse is a pulse for heating an ink to a predetermined temperature before the ink is actually discharged. The pulse width of this pulse is set to be smaller than a minimum pulse width t5 required to discharge the ink. Therefore, the ink is not discharged by this preheat pulse. The preheat pulse is applied to each heater 102 to increase the initial temperature of the ink to a predetermined temperature in advance so as to always make the amount of ink discharged constant when a constant heat pulse is applied to the heater 102 afterward. In contrast to this, the temperature of the ink may be adjusted in advance by adjusting the width of a preheat pulse. In this case, for the same heat pulse, the amount of ink discharged can be changed. In addition, by heating ink before application of a heat pulse, the start time required to discharge the ink upon application of the heat pulse can be shortened to improve the responsibility.

The heat pulse is a pulse for actually discharging the ink. The pulse width of the heat pulse is set to be larger than the minimum pulse width t5 required to discharge the ink. Energy generated by each heater 102 is proportional to the width (application time) of a heat pulse. Therefore, variations in the characteristics of the heaters 102 can be adjusted by adjusting the width of each heat pulse.

Note that the amount of ink discharged can also be adjusted by adjusting the interval between a preheat pulse and a heat pulse to control the dispersed state of heat upon application of the preheat pulse.

As is apparent from the above description, the amount of ink discharged can be controlled both by adjusting the application time of a preheat pulse and by i- adjusting the interval between application of a preheat pulse and that of a heat pulse. Therefore, by adjusting the application time of a preheat pulse or the interval between application of a preheat pulse and that of a heat pulse as needed, the amount of ink discharged or the responsibility of discharging of the ink with respect to an applied pulse can be arbitrarily adjusted.

Such adjustment of the amount of ink discharged will be described in detail next.

Assume that an ink is discharged in different amounts from discharging openings (nozzles) 108a, 108b, and 108c upon application of the same voltage pulse, as shown in FIG. 4. More specifically, assume that when a voltage having a predetermined pulse width is applied at a predetermined temperature, the amount of ink discharged from the nozzle 108a is 36 pl (pico-liters); the amount of ink discharged from the nozzle 108b, 40 pl; and the amount of ink discharged from the nozzle 108c, 40 pl, and the resistance of heaters 102a and 102b corresponding to the nozzles 108a and 108b is 200Ω, and the resistance of a heater 102c corresponding to the nozzle 108c is 210Ω. Assume that the amounts of ink discharged from the nozzles 108a, 108b, and 108c are to be adjusted to 40 pl.

The widths of a preheat pulse and a heat pulse may be adjusted to adjust the amounts of ink discharged from the nozzles 108a, 108b, and 108c to the same amount. Various combinations of the widths of preheat pulses and heat pulses are conceivable. In this case, the amounts of energy generated by heat pulses are made equal for the three nozzles, and the amounts of ink discharged are adjusted by adjusting the widths of preheat pulses.

Since the heaters 102a and 102b for the nozzles 108a and 108b have the same resistance, i.e., 200Ω, the amounts of energy generated by heat pulses can be made equal by applying voltage pulses having the same width to the heaters 102a and 102b. In this case, the width of each voltage pulse is set to be t3 which is larger than the width t5. An ink is discharged in different amounts, i.e., 36 pl and 40 pl, from the nozzles 108a and 108b upon application of identical heat pulses. In order to increase the amount of ink discharged from the nozzle 108a, a preheat pulse having a width t2 larger than a width tl of a preheat pulse applied to the heater 102b is applied to the heater 102a. With this operation, the amounts of ink discharged from the heaters 108a and 108b can be adjusted to 40 pl.

The heater 102c for the nozzle 108c has a resistance of 210Ω, which is higher than the resistance of the two remaining heaters 102a and 102b. For this reason, in order to cause the heater 102c to generate the same amount of energy as that generated by the two remaining heaters, the width of a heat pulse must be set to be larger than that of the above heat pulse. In this case, therefore, the width of the heat pulse is set to be t4 which is larger than the width t3. Since the amounts of ink discharged from the nozzles 108b and 108c upon application of a predetermined energy are the same, the width of a preheat pulse required is equal to that of a preheat pulse applied to the heater 102b. That is, a preheat pulse having the width tl is applied to the heater 102c.

In the above manner, the same amount of ink can be discharged from the nozzles 108a, 108b, and 108c which discharge an ink in different amounts upon application of a predetermined pulse. In addition, the amounts of ink discharged may be intentionally made to differ from each other.

Note that preheat pulses are used to reduce variations in the discharging operation of each nozzle.

FIGS. 5A to 5F show the process of manufacturing a color filter. The process of manufacturing a color filter 54 will be described next with reference to FIGS. 5A to 5F.

FIG. 5A shows a glass substrate 1 having a black matrix 2 for forming light-transmitting portions 9 and light-shielding portions 10. First of all, the glass substrate 1, on which the black matrix 2 is formed, is coated with a resin composition which has good ink receptivity but exhibits a deterioration in ink receptivity under a certain condition (e.g., irradiation of light or irradiation of light and heating), and is cured under a certain condition. The resultant structure is pre-baked, as needed, to form a resin composition layer 3 (FIG. 5B). The resin composition layer 3 can be formed by a coating method such as spin coating, roller coating, bar coating, spraying, or dipping. However, the present invention is not limited to any specific coating method.

Subsequently, pattern exposure is performed in advance onto resin layer portions on the light-shielding portions 10 by using a photomask 4 to make the exposed portions of the resin layer have receptivity for an ink (FIG. 5C). As a result, the resin composition layer 3 has ink-receiving portions 6 and portions 5 each exhibiting a deterioration in ink receptivity (FIG. 5D). In discharging inks while relatively scanning the ink-jet head over the substrate a number of times, the relative scanning operation may be performed by moving the substrate while the ink-jet head is fixed, or by moving the ink-jet head while the substrate is fixed.

After this step, R (red), G (green), and B (blue) inks are discharged onto the resin composition layer 3 by an ink-jet system to color the layer at once (FIG. 5E), and the inks are dried, as needed. As the ink-jet system, a system based on heat energy or a system based on mechanical energy may be used. Either of the systems will do. An ink to be used is not specifically limited as long as it can be used for an ink-jet operation. As coloring materials for the ink, materials suitable for the transmission spectra required for R, G, and B pixels are properly selected from various dyes and pigments. Although inks discharged from the ink-jet head may adhere to the resin composition layer 3 in the form of droplets, the inks preferably adhere to the layer in the form of columns without separating from the ink-jet head.

The colored resin composition layer 3 is cured by irradiation of light or irradiation of light and a heat treatment, and a protective layer 8 is formed, as needed (FIG. 5F). In order to cure the resin composition layer 3, the condition for the above process of forming the portions having affinities for an ink may be changed, e.g., the exposure amount in irradiation of light is increased, or the heating condition is made stricter. Alternatively, both irradiation of light and a heat treatment may be performed.

FIGS. 6 and 7 are sectional views each showing the basic structure of the color liquid crystal display device 30 incorporating the above color filter.

In general, a color liquid crystal display device is formed by joining the color filter substrate 1 to a counter substrate 21 and sealing a liquid crystal compound 18 therebetween. TFTs (Thin Film Transistors) (not shown) and transparent pixel electrodes 20 are formed on the inner surface of one substrate 21 of the liquid crystal display device in a matrix form. The color filter 54 is placed on the inner surface of the other substrate 1 such that the R, G, and B coloring materials are positioned to oppose the pixel electrodes. A transparent counter electrode (common electrode) 16 is formed on the entire surface of the color filter 10. The black matrix 2 is generally formed on the color filter substrate 1 side (see FIG. 6). However, in a BM (Black Matrix) on-array type liquid crystal display device, such a grating is formed on the TFT substrate side opposing the color filter substrate (see FIG. 7). Aligning films 19 are formed within the planes of the two substrates. By performing a rubbing process for the aligning films 19, the liquid crystal molecules can be aligned in a predetermined direction. Polarizing plates 11 and 22 are bonded to the outer surface of the respective glass substrates. The liquid crystal compound 18 is filled in the gap (about 2 to 5 $\mu$m) between these glass substrates. As a blacklight, a combination of a fluorescent lamp (not shown) and a scattering plate (not shown) is generally used. A display operation is performed by causing the liquid crystal compound to serve as an optical shutter for changing the transmittance for light emitted from the backlight.

A case wherein the above liquid crystal panel is applied to an information processing apparatus will be described below with reference to FIGS. 8 to 10.

Figure 8:
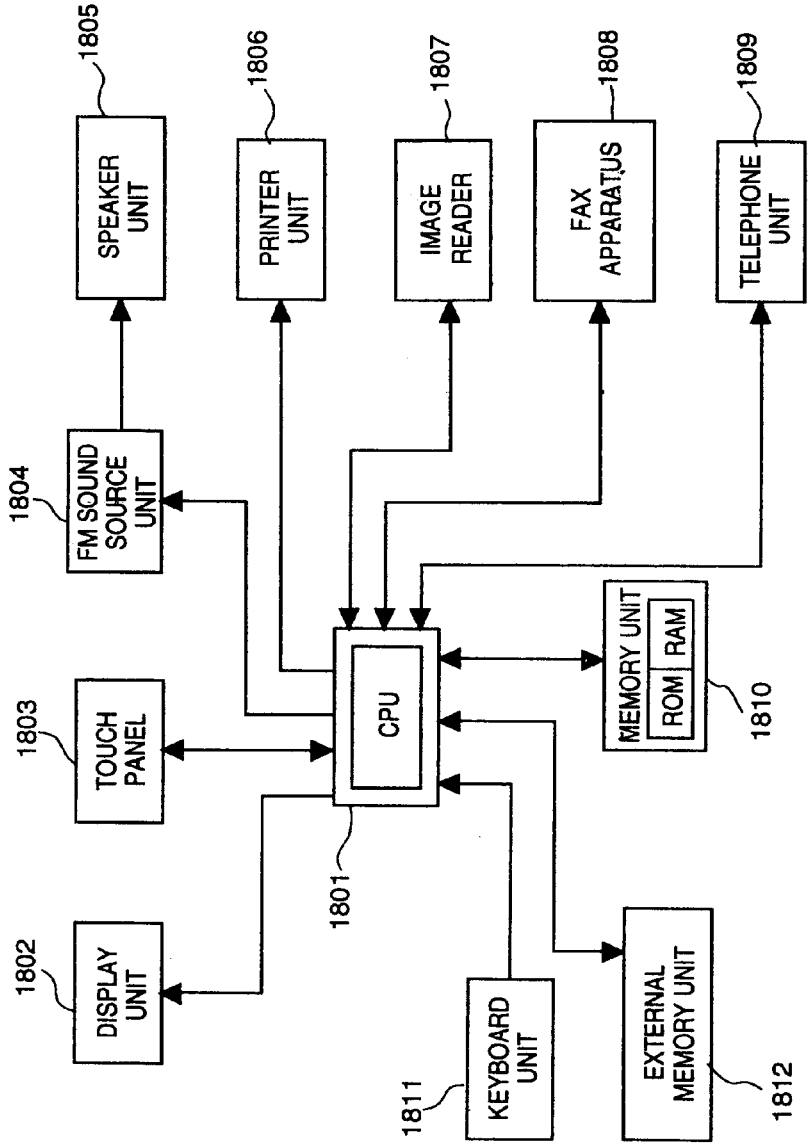
FIG. 8 is a block diagram showing an information processing apparatus using a liquid crystal display device.

FIG. 8 is a block diagram showing the schematic arrangement of an information processing apparatus serving as a wordprocessor, a personal computer, a facsimile apparatus, and a copying machine, to which the above liquid crystal display device is applied.

Referring to FIG. 8, reference numeral 1801 denotes a control unit for controlling the overall apparatus. The control unit 1801 includes a CPU such as a microprocessor and various I/O ports, and performs control by outputting/inputting control signals, data signals, and the like to/from the respective units. Reference numeral 1802 denotes a display unit for displaying various menus, document information, and image data read by an image reader 1807, and the like on the display screen; 1803, a transparent, pressure-sensitive touch panel mounted on the display unit 1802. By pressing the surface of the touch panel 1803 with a finger of the user or the like, an item input operation, a coordinate position input operation, or the like can be performed on the display unit 1802.

Reference numeral 1804 denotes an FM (Frequency Modulation) sound source unit for storing music information, created by a music editor or the like, in a memory unit 1810 or an external memory unit 1812 as digital data, and reading out the information from such a memory, thereby performing FM modulation of the information. An electrical signal from the FM sound source unit 1804 is converted into an audible sound by a speaker unit 1805. A printer unit 1806 is used as an output terminal for the wordprocessor, the personal computer, the facsimile apparatus, and the copying machine.

Reference numeral 1807 denotes an image reader unit for photoelectrically reading original data. The image reader unit 1807 is arranged midway along the original convey passage and designed to read originals for facsimile and copy operations and other various originals.

Reference numeral 1808 denotes a transmission/reception unit for the facsimile (FAX) apparatus. The transmission/reception unit 1808 transmits original data read by the image reader unit 1807 by facsimile, and receives and decodes a sent facsimile signal. The transmission/reception unit 1808 has an interface function for external units. Reference numeral 1809 denotes a telephone unit having a general telephone function and various telephone functions such as an answering function.

Reference numeral 1810 denotes a memory unit including a ROM for storing system programs, manager programs, application programs, fonts, and dictionaries, a RAM for storing an application program loaded from the external memory unit 1812 and document information, a video RAM, and the like.

Reference numeral 1811 denotes a keyboard unit for inputting document information and various commands.

Reference numeral 1812 denotes an external memory unit using a floppy disk, a hard disk, and the like. The external memory unit 1812 serves to store document information, music and speech information, application programs of the user, and the like.

Figure 9:
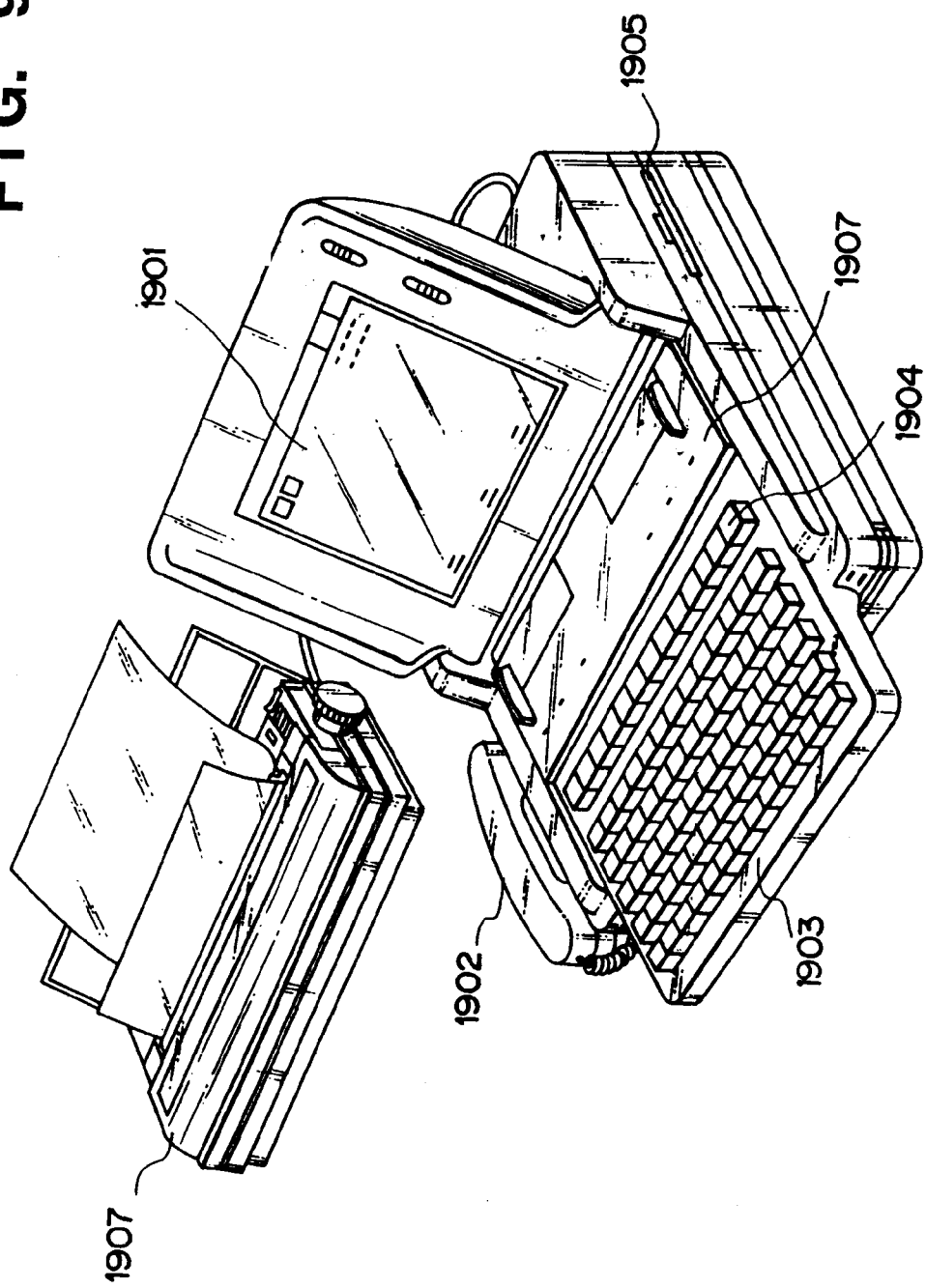
FIG. 9 is a perspective view showing the information processing apparatus using the liquid crystal display device.

FIG. 9 is a perspective view of the information processing apparatus in FIG. 8.

Referring to FIG. 9, reference numeral 1901 denotes a flat panel display using the above liquid crystal panel, which displays various menus, graphic pattern information, document information, and the like. A coordinate input or item designation input operation can be performed on the flat panel display 1901 by pressing the surface of the touch panel 1803 with a finger of the user or the like. Reference numeral 1902 denotes a handset used when the apparatus is used as a telephone set. A keyboard 1903 is detachably connected to the main body via a cord and is used to perform various document functions and input various data. This keyboard 1903 has various function keys 1904. Reference numeral 1905 denotes an insertion port through which a floppy disk is inserted into the external memory unit 1812.

Reference numeral 1906 denotes an original table on which an original to be read by the image reader unit 1807 is placed. The read original is discharged from the rear portion of the apparatus. In a facsimile receiving operation, received data is printed out by an ink-jet printer 1907.

When the above information processing apparatus is to serve as a personal computer or a wordprocessor, various kinds of information input through the keyboard unit 1811 are processed by the control unit 1801 in accordance with a predetermined program, and the resultant information is output, as an image, to the printer unit 1806.

When the information processing apparatus is to serve as the receiver of the facsimile apparatus, facsimile information input through the transmission/reception unit 1808 via a communication line is subjected to reception processing in the control unit 1801 in accordance with a predetermined program, and the resultant information is output, as a received image, to the printer unit 1806.

When the information processing apparatus is to serve as the copying machine, an original is read by the image reader unit 1807, and the read original data is output, as an image to be copied, to the printer unit 1806 via the control unit 1801. Note that when the information processing apparatus is to serve as the receiver of the facsimile apparatus, original data read by the image reader unit 1807 is subjected to transmission processing in the control unit 1801 in accordance with a predetermined program, and the resultant data is transmitted to a communication line via the transmission/reception unit 1808.

Figure 10:
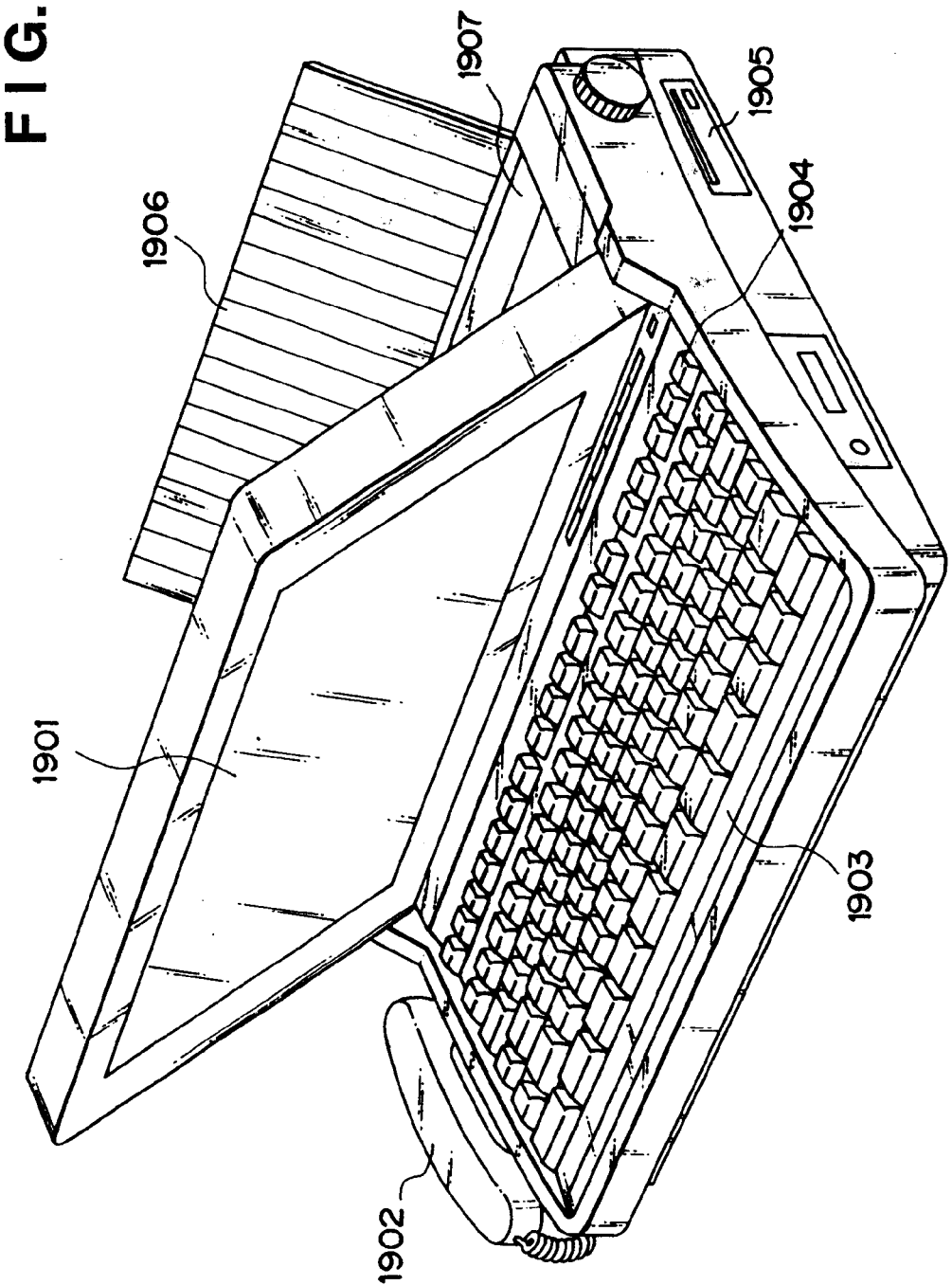
FIG. 10 is a perspective view showing the information processing apparatus using the liquid crystal display device.

Note that the above information processing apparatus may be designed as an integrated apparatus incorporating an ink-jet printer in the main body, as shown in FIG. 10. In this case, the portability of the apparatus can be improved. The same reference numerals in FIG. 10 denote parts having the same functions as those in FIG. 9.

Two typical methods of reducing density irregularity in the respective pixels of a color filter will be described next.

Figure 11:
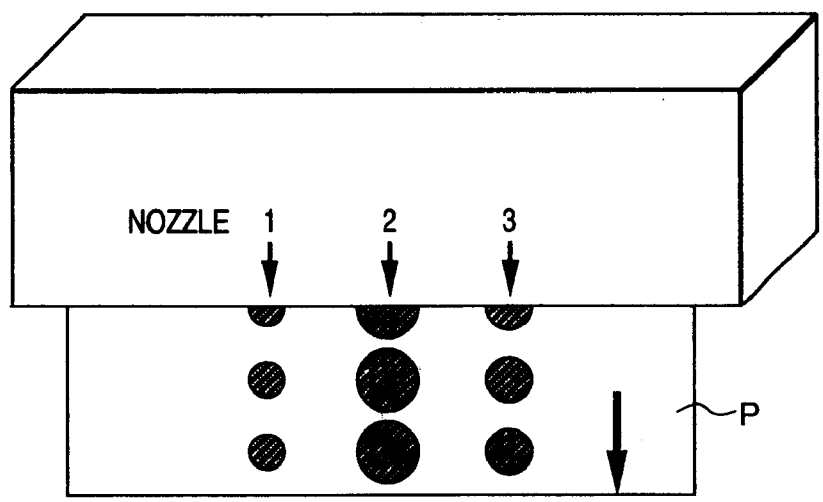
FIG. 11 is a view for explaining a method of correcting the differences between the amounts of inks discharged from the respective nozzles.
Figure 12:
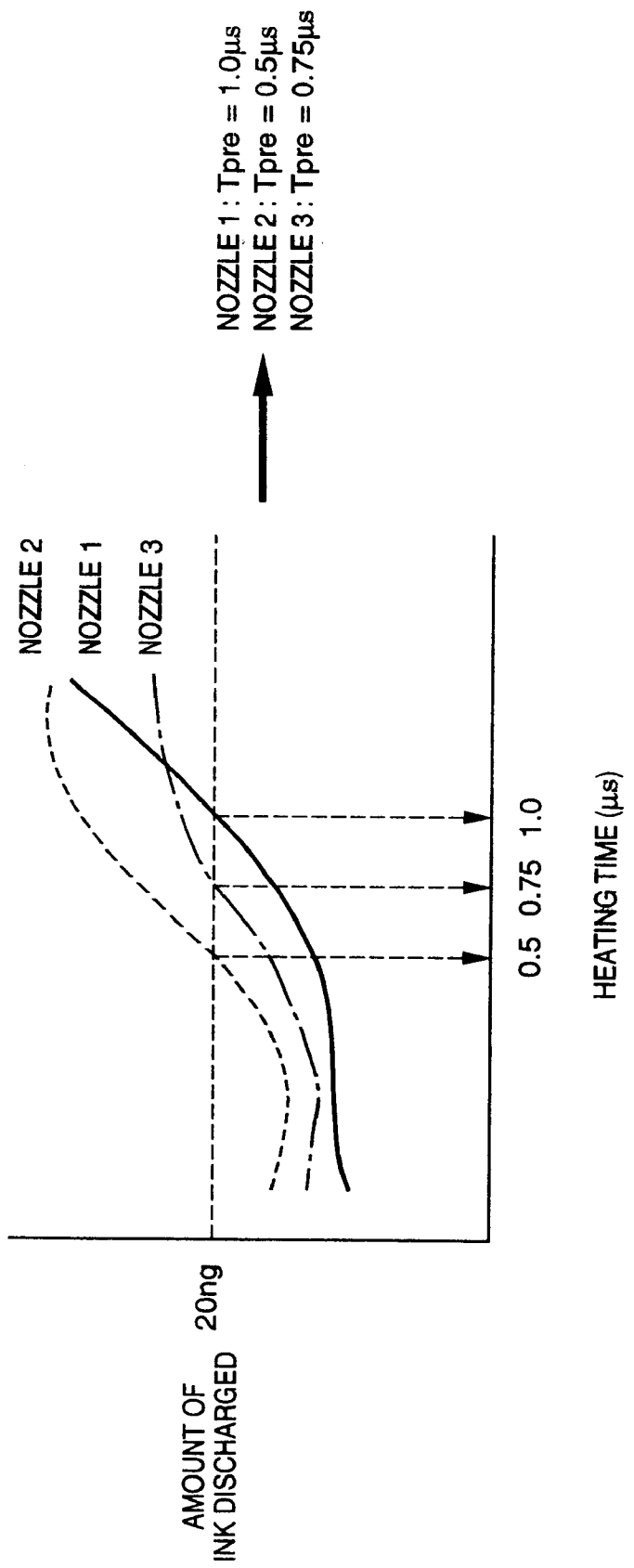
FIG. 12 is a graph for explaining the method of correcting the differences between the amounts of inks discharged from the respective nozzles.
Figure 13:
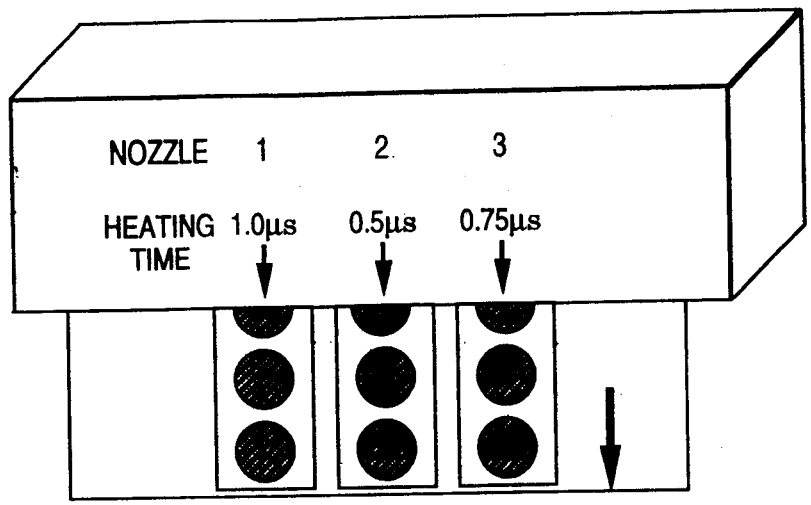
FIG. 13 is a view for explaining the method of correcting the differences between the amounts of inks discharged from the respective nozzles.

FIGS. 11 to 13 show a method (to be referred to as bit correction) of correcting the differences between the amounts of inks discharged from the respective nozzles of an ink-jet head IJH having a plurality of ink discharging nozzles.

First of all, as shown in FIG. 11, the ink-jet head IJH discharges inks from three nozzles 1, 2, and 3, for example, onto a predetermined substrate P, and measures the sizes of ink dots formed on the substrate P by the inks discharged from the respective nozzles, thereby measuring the amounts of inks discharged from the respective nozzles. In this case, a heat pulse (see FIG. 4) applied to the heater of each nozzle is set to a predetermined width, and the width of a preheat pulse (see FIG. 4) is changed, as described above. With this operation, curves representing the relationships between the widths of preheat pulses (represented by the heating times in FIG. 12) and the amounts of inks discharged are obtained, as shown in FIG. 12. Assume that all the amounts of inks discharged from the respective nozzles are to be uniformly set to 20 ng. In this case, as is apparent from the curves in FIG. 12, the widths of preheat pulses to be applied to the nozzles 1, 2, and 3 are 1.0 μs, 0.5 μs, and 0.75 μs, respectively. Therefore, by applying the preheat pulses having these widths to the heaters of the respective nozzles, all the amounts of inks discharged from the respective nozzles can be uniformly set to 20 ng, as shown in FIG. 13. This method of correcting the amounts of inks discharged from the respective nozzles is called bit correction. In this embodiment, the width of each preheat pulse is changed in four steps to realize a correction width of about 30%. The resolution of this correction is 2 to 3%.

Figure 14:
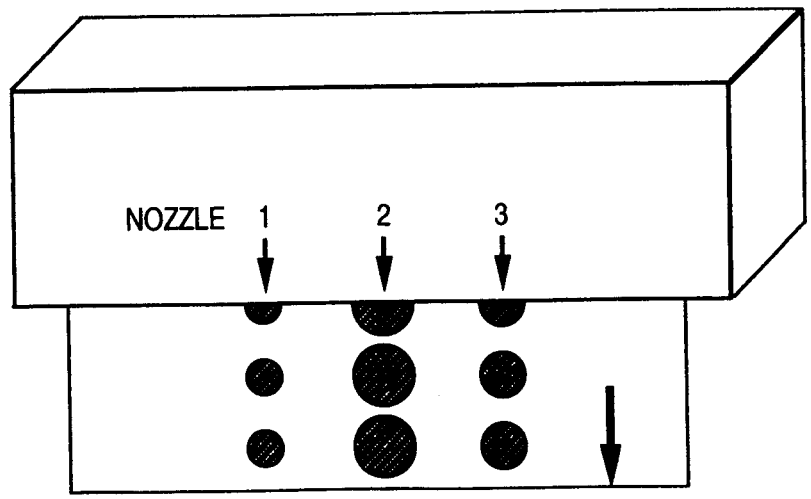
FIG. 14 is a view for explaining a method of changing ink discharging densities.
Figure 15:
FIG. 15 is a view for explaining the method of changing ink discharging densities.
Figure 16:
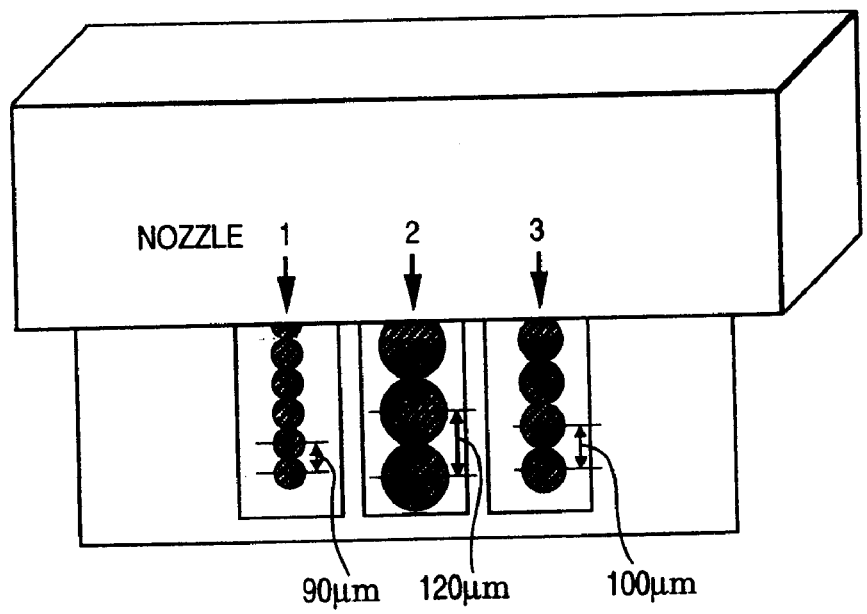
FIG. 16 is a view for explaining the method of changing ink discharging densities.

FIGS. 14 to 16 show a method (to be referred to as shading correction hereinafter) of correcting density irregularity in the scanning direction of an ink-jet head by adjusting the discharging densities of inks from the respective ink discharging nozzles.

Assume that the amounts of inks discharged from the nozzles 1 and 2 of the ink-jet head are −10% and +20%, respectively, with respect to the amount of ink discharged from the nozzle 3, as shown in FIG. 14. In this case, while the ink-jet head IJH is scanned, one heat pulse is applied to the heater of the nozzle 1 for every nine reference clocks, one heat pulse is applied to the nozzle 2 for every 12 reference clocks, and one heat pulse is applied to the nozzle 3 for every 10 reference clocks, as shown in FIG. 15. With this operation, the number of times an ink is discharged in the scanning direction is changed for each nozzle to make the ink densities in the respective pixels of the color filter in the scanning direction uniform, as shown in FIG. 16, thereby preventing density irregularity of the respective pixels. This method of correcting the ink discharging densities in the scanning direction is called shading correction. In this embodiment, a correction width of about 40% is realized by this correction. Although control can be performed with an unlimited resolution of correction, a large amount of data is required, and the operation speed decreases. For this reason, the practical resolution is limited to about 10%.

A method of reducing the differences in coloring density between the respective pixels by changing the discharging positions of inks in each scanning operation will be described next. This method is a characteristic feature of this embodiment.

Figure 17A:
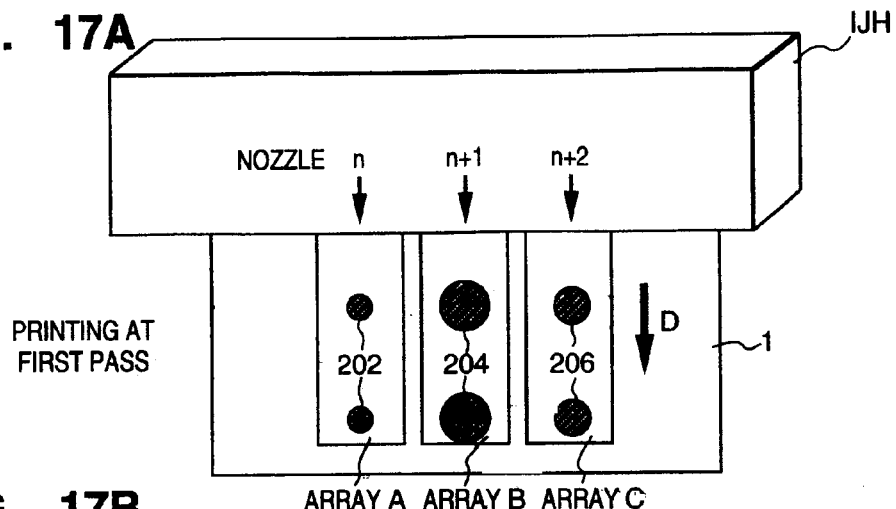
FIGS. 17A, 17B and 17C are views showing a state wherein the discharging start positions of inks are changed in the respective scanning operations.
Figure 17B:
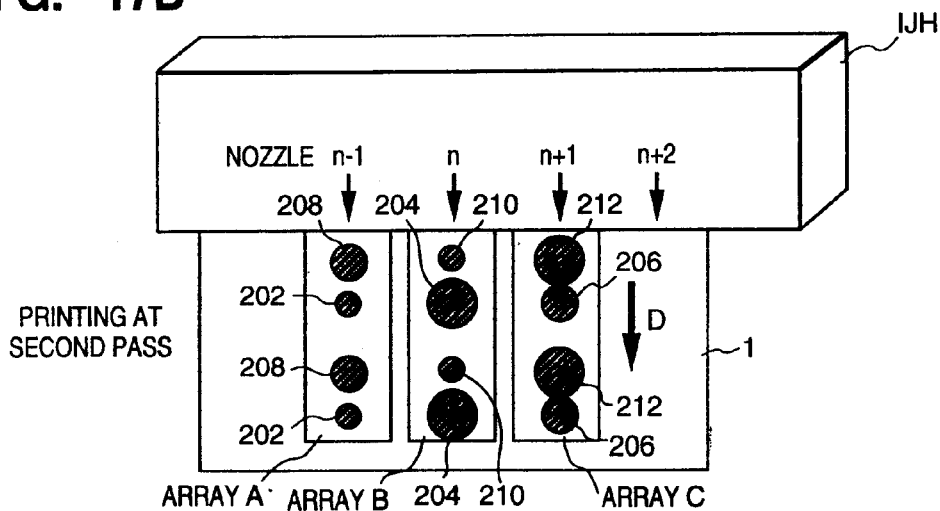
Figure 17C:
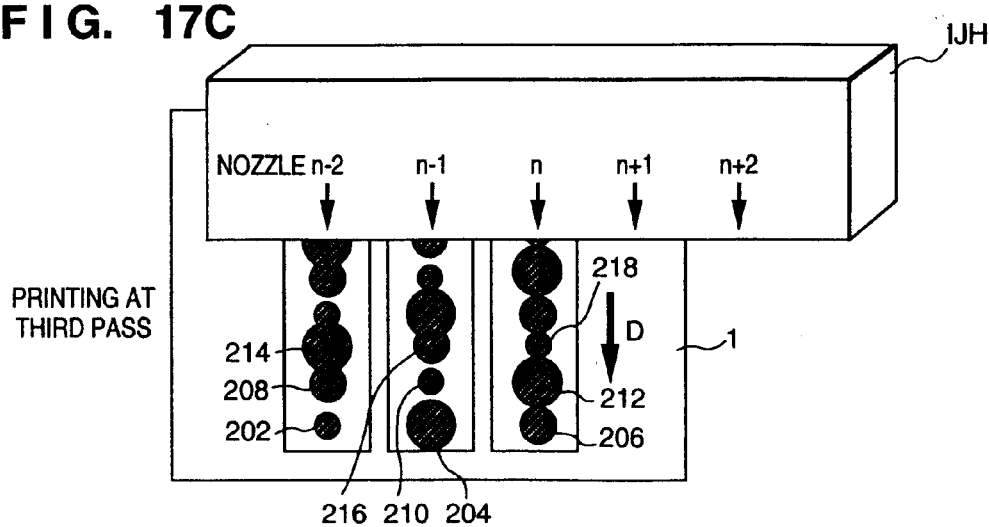

FIGS. 17A to 17C show the first example of the method of reducing the differences in coloring density between the respective pixels by changing the discharging positions of inks in each scanning operation. Referring to FIGS. 17A to 17C, of the many arrays of pixels of a color filter, three arrays of pixels will be considered. These arrays of pixels are colored while the ink-jet head IJH having a plurality of ink discharging nozzles is scanned in the direction in which these pixel arrays are arranged.

As shown in FIG. 17A, in the first scanning operation of the ink-jet head IJH, the nth, (n+1)th, and (n+2)th nozzles of the plurality of nozzles are used to color the three arrays of pixels. Inks 202 are discharged from the nth nozzle onto an array A of pixels. Inks 204 are discharged from the (n+1)th nozzle onto an array B of pixels. Inks 206 are discharged from the (n+2)th nozzle onto an array C of pixels. In the first scanning operation, as shown in FIG. 17A, the inks are discharged to alternate positions from the start position of each pixel array. Note that in FIGS. 17A to 17C, each arrow D indicates the moving direction of the glass substrate 1. Each pixel is colored while the ink-jet head IJH is scanned with respect to the glass substrate 1 in the opposite direction to the direction indicated by the arrow D.

Subsequently, as shown in FIG. 17B, in the second scanning operation, inks 208 are discharged from the (n−1)th nozzle of the ink-jet head IJH onto the array A of pixels; inks 210, from the nth nozzle onto the array B of pixels; and inks 212, from the (n+1)th nozzle onto the array C of pixels. In the second scanning operation, the ink discharging intervals are set to be the same as those in the first scanning operation, and each discharging start position of ink is changed to a position adjacent to the ink dot formed in the first scanning operation. With this operation, the gaps between the respective ink dots formed in the first scanning operation are filled with the inks discharged in the second scanning operation. Furthermore, in the second scanning operation, the correspondence between each pixel array and the ink discharging nozzle used for coloring is changed (i.e., the nth nozzle is used for, e.g., the array A, in the first scanning operation, and the (n−1)th nozzle is used in the second scanning operation). With this operation, variations in the amounts of inks discharged from the respective nozzles are averaged for the respective pixel arrays, thereby reducing the density irregularity in the respective pixel arrays.

As shown in FIG. 17C, in the third scanning operation, inks 214 are discharged from the (n−2)th nozzle of the ink-jet head IJH onto the array A of pixels; inks 216, from the (n−1)th nozzle onto the array B of pixels; and inks 218, from the nth nozzle onto the array C of pixels. In the third scanning operation, the ink discharging intervals are set to be the same as those in the second scanning operation, and each discharging start position is changed to a position adjacent to the ink dot formed in the second scanning operation. With this operation, the gaps between the respective ink dots formed in the first and second scanning operations are filled with the inks. In this manner, the ink discharging positions are changed in each scanning operation to fill the gaps between the ink dots formed in the previous scanning operations, thereby coloring the respective pixels in uniform density.

In the above case, the correspondence between the nozzles of the ink-jet head IJH and the respective pixel arrays is changed in each scanning operation. If, however, the amounts of inks discharged from the respective nozzles of the ink-jet head IJH are made uniform by the above bit correction, the densities of the respective pixels can be made uniform without changing the correspondence between the nozzles and the respective pixels. In addition, a combination of bit correction and the operation of changing the correspondence between the nozzles of the respective pixels in each scanning operation can further reduce the density irregularity in the respective pixels.

Figure 18B:
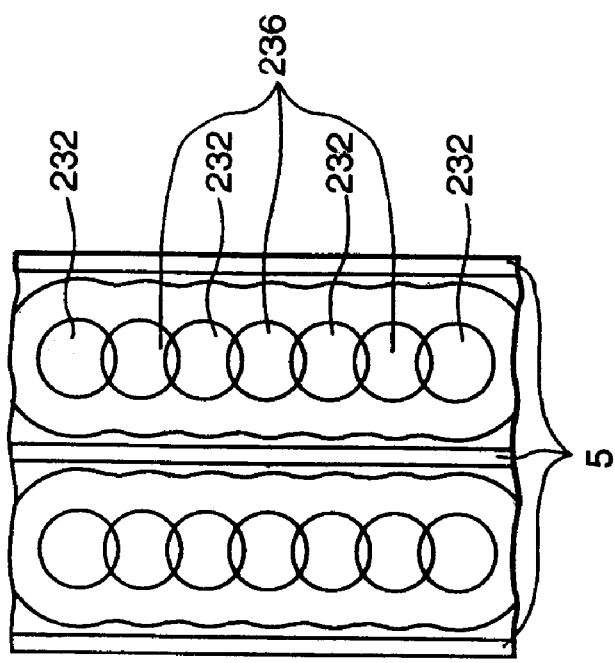
FIGS. 18A and 18B are views showing a state wherein inks are discharged in the first scanning operation such that ink dots are partly joined to each other.
Figure 18A:
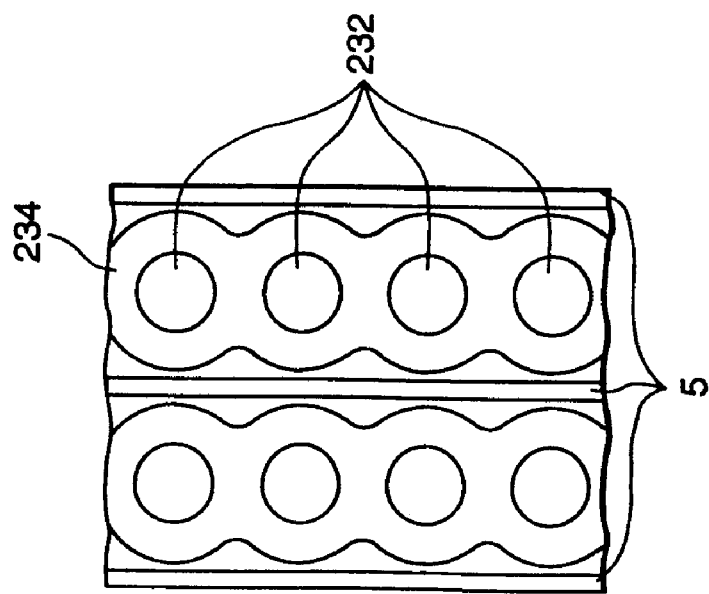

FIGS. 18A and 18B show the second example of the method of reducing the coloring density differences between the respective pixels by changing the ink discharging positions in each scanning operation.

Prior to a description with reference to FIGS. 18A and 18B, a possible problem posed in the first example of the method will be described with reference to FIGS. 19A and 19B.

Figure 19A:
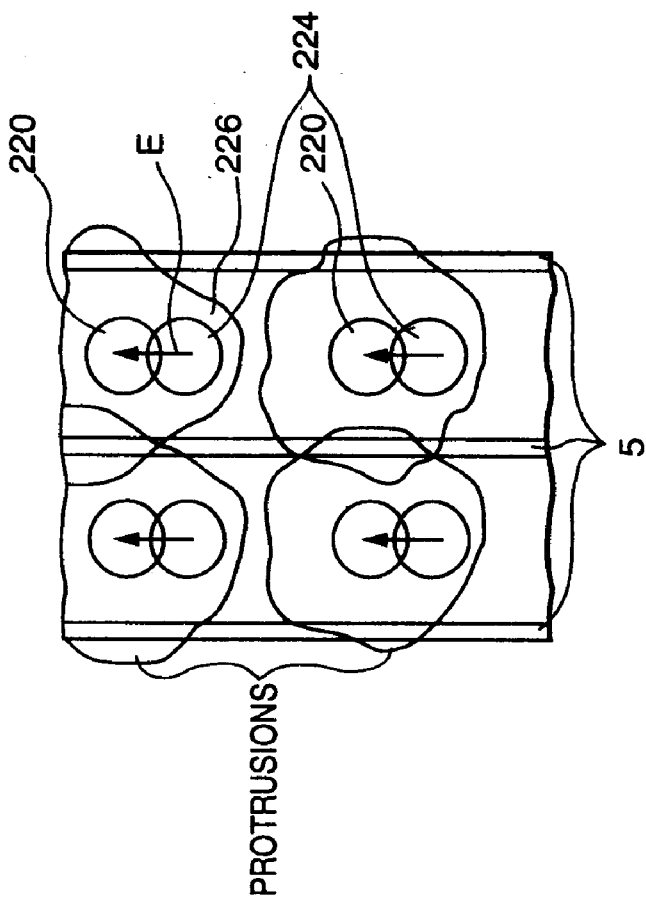
FIGS. 19A and 19B are views showing a state wherein inks are discharged in the first scanning operation such that ink dots are not joined to each other.
Figure 19B:
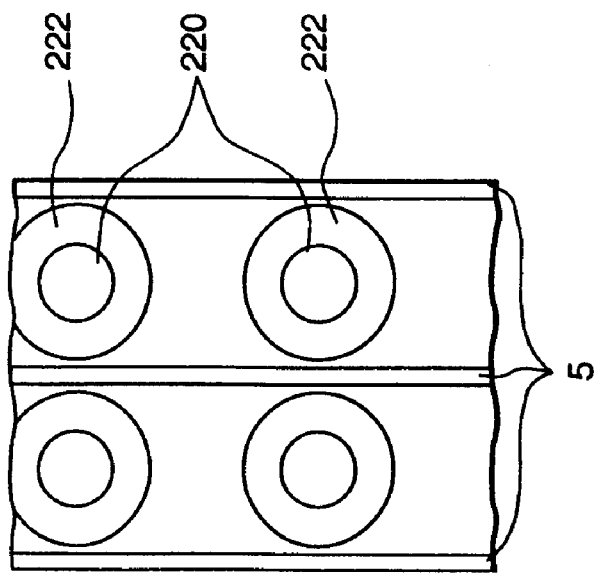
Figure 20:
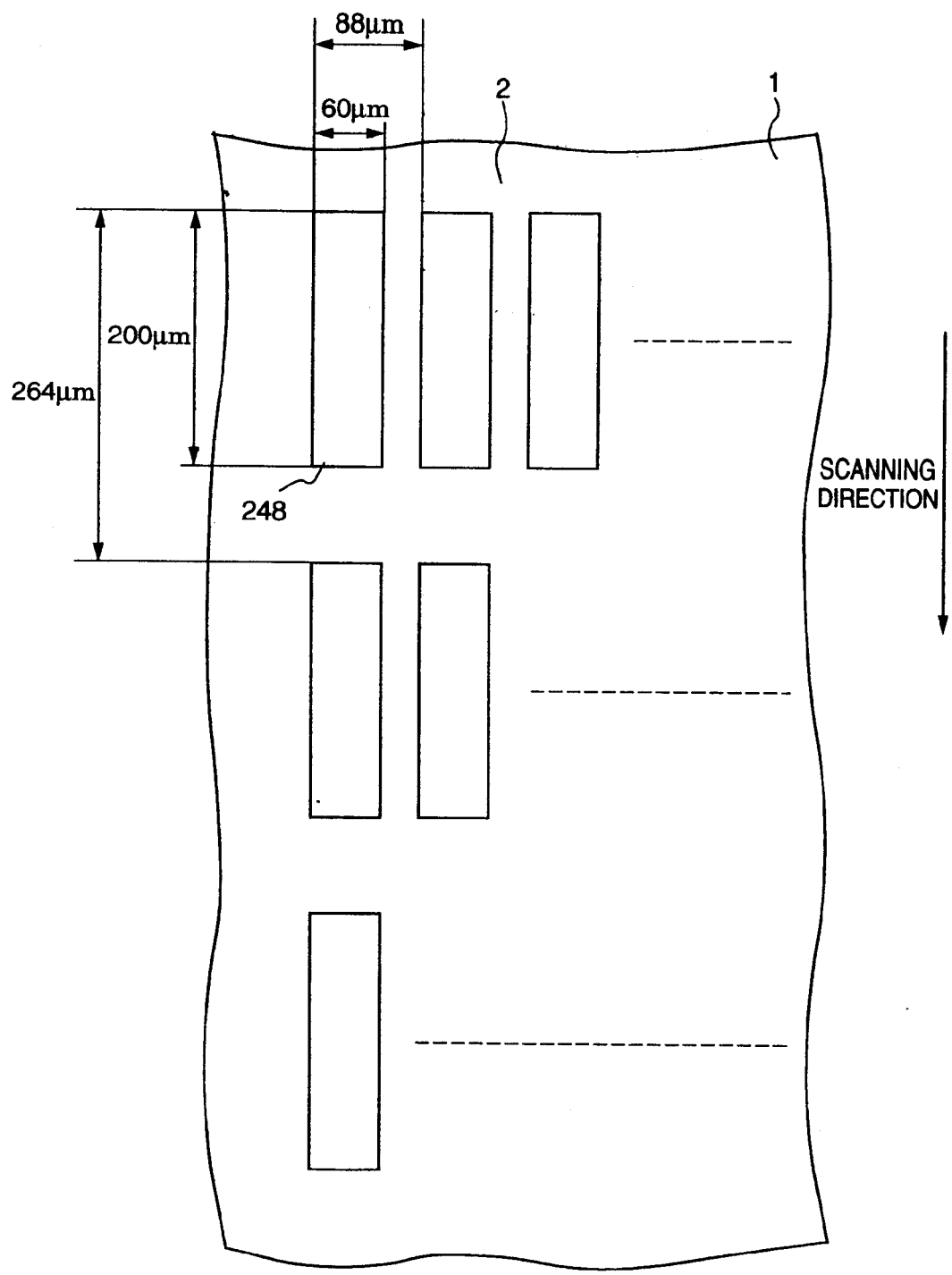
FIG. 20 is a view showing the size of each pixel of a color filter.

FIGS. 19A and 19B show a case wherein inks 220 are discharged to alternate positions, in the first scanning operation of a plurality of scanning operations, at long intervals such that ink dots 222 formed by the respective inks are not joined to each other. Assume that in the second scanning operation, as shown in FIG. 19B, inks 224 are discharged to positions adjacent to the ink dots 222 formed without overlapping each other in the first scanning operation, as shown in FIG. 19A. In this case, if the ink dots 222 formed in the first scanning operation has become completely dry, no problem is posed. If, however, the inks 220 are still in a liquid state and present on the surface of the rein composition layer 3 (see FIGS. 5A to 5F), the inks 224 are drawn in the direction of the inks 220, as indicated by the arrows E, by the surface tension when they mix with each other. If the ink 224 is drawn to the ink 220 discharged before the ink 224, the ink of a volume corresponding to the two discharged inks is absorbed in a substantially one portion. As a result, as shown in FIG. 19B, inks 226 overflow the boundaries defined by the portions 5, of the resin composition layer 3, which have no affinity for inks. These inks may flow to the adjacent pixel arrays to cause color mixture between the adjacent pixels.

In order to obtain a better result, according to the second example, inks 232 are discharged to form ink dots 234 in high density at relatively short intervals such that the ink dots are partly joined to each other in the first scanning operation, as shown in FIG. 18A. With this operation, as shown in FIG. 18B, when inks 236 are discharged to positions between the inks 232 in the second scanning operation, each ink 236 is uniformly drawn to the two adjacent inks 232. As a result, each ink 236 lands at substantially the middle position between the two inks 232. Therefore, the inks do not concentrate in one portion, and the inks uniformly spread in the respective pixels without overflowing, thereby uniformly coloring the respective pixels.

A practical example in which a color filter is colored by the first example of the method will be described next.

Each pixel (each opening portion of a black matrix) of the color filter to be colored is 200 µm long and 60 µm wide. The pitch of the respective pixels in the scanning direction of the head is 264 µm, and the pitch in the direction perpendicular to the scanning direction is 88 µm.

Figure 21:
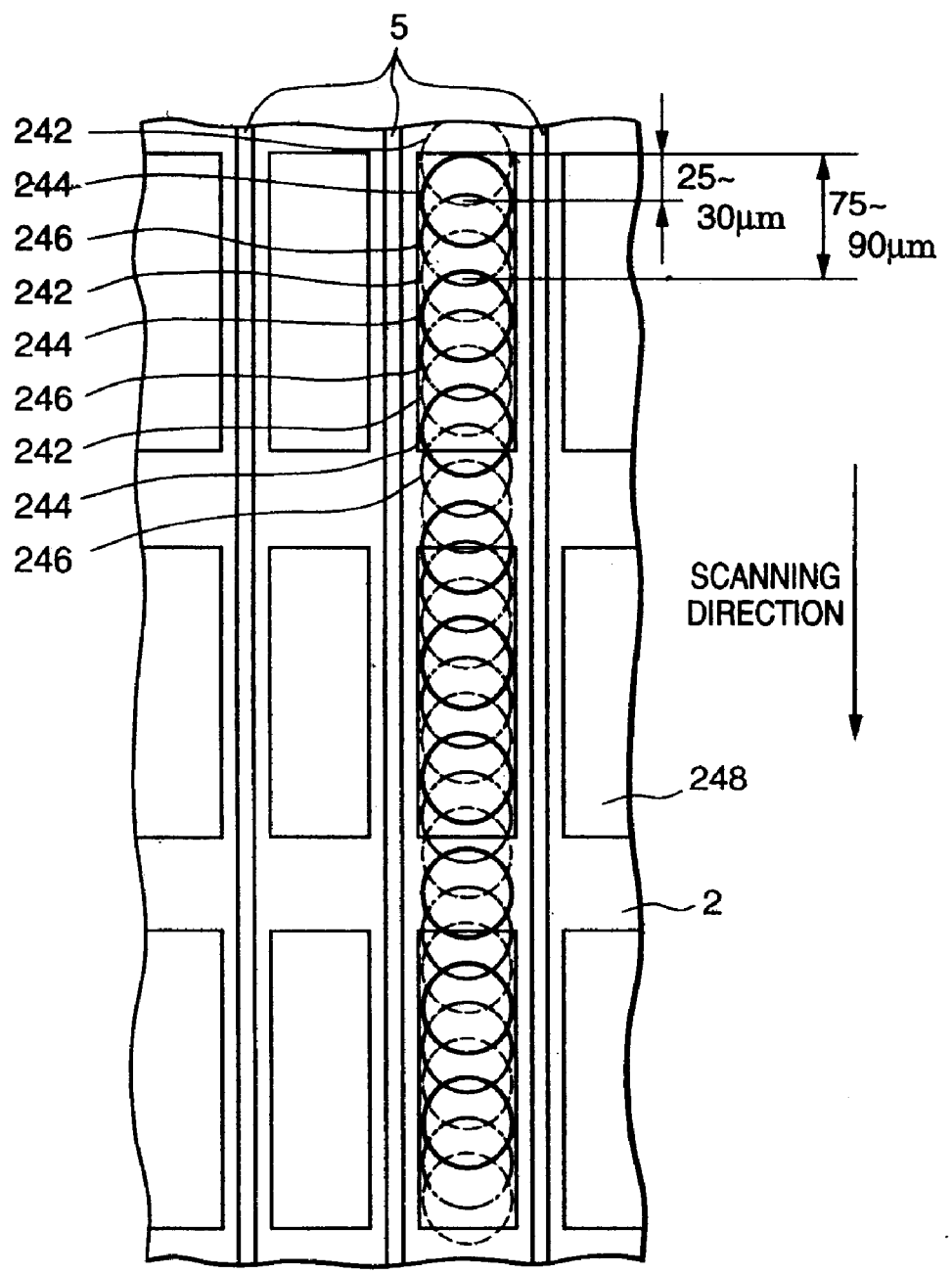
FIG. 21 is a view for explaining an example of how a color filter is colored.

In the first scanning operation, as indicated by the dotted lines in FIG. 21, ink dots 242 were formed, at intervals of 75 µm to 90 µm, on a glass substrate 1 on which the opening portions 248 of the black matrix were formed. In the second scanning operation, as indicated by the solid lines in FIG. 21, ink dots 244 were formed at the positions 25 to 30 µm away from the ink dots formed in the first scanning operation. In the third scanning operation, as indicated by the alternate long and short dashed lines in FIG. 21, ink dots 246 were formed at the positions 25 to 30 µm away from the ink dots formed in the second scanning operation. In this manner, the ink dots were formed in the respective pixels at intervals of 25 to 30 µm by the three scanning operations, thereby forming and coloring the ink dots in the respective pixels at intervals of 25 to 30 µm.

As an apparatus for coloring the color filter, the apparatus shown in FIG. 1 was used, and each ink-jet head was driven at a frequency of about 500 Hz. Each ink used consists of 5% of a dye, 20% of diethylene glycol, and 75% of water.

When the color filter was colored in the above manner, an excellent color filter with very little color irregularity which was free from color omission and color mixture could be manufactured.

As described above, according to the above embodiment, when a color filter is to be manufactured by coloring each pixel by a plurality of scanning operations, a color filter with very little color irregularity can be manufactured by changing the ink discharging start positions in the respective scanning operations.

Figure 22:
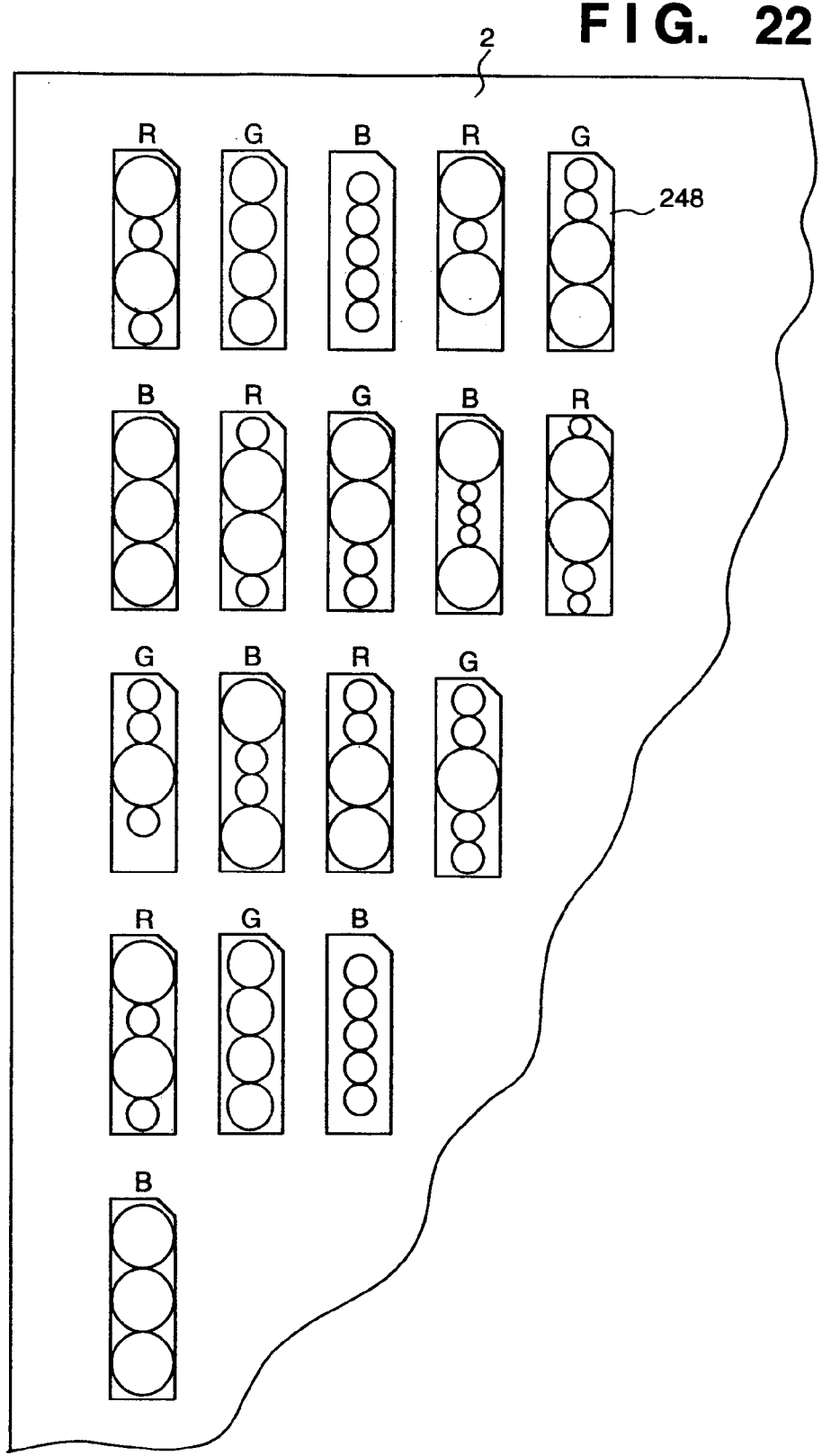
FIG. 22 is a view for explaining another example of how a color filter is colored.

In the above embodiment, as shown in FIG. 21, each array of pixels are colored in the same color in the longitudinal direction of the pixels. However, when the RGB arrangement of a liquid crystal panel to be manufactured is of a staggered or delta type, the ink discharging positions may be changed in the respective pixels 248, as shown in FIG. 22. Note that the portions, in each pixel 248, which are indicated by the solid circles in FIG. 22 are ink dots.

Various changes and modifications of the above embodiments can be made without departing the spirit and scope of the invention.

The present invention is applied to the print apparatus of the system, among various ink-jet recording systems, which has a means (e.g., an electricity-to-heat converter or laser light) for generating heat energy as energy used to discharge an ink, and changes the state of an ink by using the heat energy. According to this system, a high-density, high-resolution recording operation can be realized.

As for the typical structure and principle, it is preferable that the basic structure disclosed in, for example, U.S. Pat. No. 4,723,129 or U.S. Pat. No. 4,740,796 is employed. The aforesaid method can be adapted to both a so-called on-demand type apparatus and a continuous type apparatus. In particular, a satisfactory effect can be obtained when the on-demand type apparatus is employed because of the structure arranged in such a manner that one or more drive signals, which rapidly raise the temperature of an electricity-to-heat converter disposed to face a sheet or a fluid passage which holds the fluid (ink) to a level higher than levels at which film boiling takes place are applied to the electricity-to-heat converter in accordance with recording information so as to generate heat energy in the electricity-to-heat converter and to cause the heat effecting surface of the recording head to take place film boiling so that bubbles can be formed in the fluid (ink) to correspond to the one or more drive signals. The enlargement/contraction of the bubble will cause the fluid (ink) to be discharged through a discharging opening so that one or more inks are formed. If a pulse shape drive signal is employed, the bubble can be enlarged/contracted immediately and properly, causing a further preferred effect to be obtained because the fluid (ink) can be discharged while revealing excellent responsibility.

It is preferable that a pulse drive signal disclosed in U.S. Pat. No. 4,463,359 or U.S. Pat. No. 4,345,262 be employed. If conditions disclosed in U.S. Pat. No. 4,313,124 which is an invention related to the temperature rising rate at the heat effecting surface are employed, a satisfactory recording result can be obtained.

As an alternative to the structure (linear fluid passage or perpendicular fluid passage) of the recording head disclosed in each of the above-mentioned inventions and having an arrangement that discharge ports, fluid passages and electricity-to-heat converters are combined, a structure having an arrangement that the heat effecting surface is disposed in a bent region and disclosed in U.S. Pat. No. 4,558,333 or U.S. Pat. No. 4,459,600 may be employed. In addition, the following structures may be employed: a structure having an arrangement that a common slit is formed to serve as a discharge section of a plurality of electricity-to-heat converters and disclosed in Japanese Patent Laid-Open No. 59-123670; and a structure disclosed in Japanese Patent Laid-Open No. 59-138461 in which an opening for absorbing pressure waves of heat energy is disposed to correspond to the discharge section.

Furthermore, as a recording head of the full line type having a length corresponding to the maximum width of a recording medium which can be recorded by the recording apparatus, either the construction which satisfies its length by a combination of a plurality of recording heads as disclosed in the above specifications or the construction as a single full line type recording head which has integrally been formed can be used.

In addition, the invention is effective for a recording head of the freely exchangeable chip type which enables electrical connection to the recording apparatus main body or supply of ink from the main device by being mounted onto the apparatus main body, or for the case by use of a recording head of the cartridge type provided integrally on the recording head itself.

It is preferred to additionally employ the recording head restoring means and the auxiliary means provided as the component of the present invention because the effect of the present invention can be further stabled. Specifically, it is preferable to employ a recording head capping means, a cleaning means, a pressurizing or suction means, an electricity-to-heat converter, an another heating element or a sub-heating means constituted by combining them and a sub-emitting mode in which an emitting is performed independently from the recording emitting in order to stably perform the recording operation.

Although a fluid ink is employed in the above-mentioned embodiment of the present invention, an ink which is solidified at the room temperature or lower and as well as softened at the room temperature may be used. That is, any ink which is formed into a fluid when the recording signal is supplied may be employed.

Furthermore, an ink which is solidified when it is caused to stand, and liquified when heat energy is supplied in accordance with a recording signal can be adapted to the present invention to positively prevent a temperature rise caused by heat energy by utilizing the temperature rise as energy of state transition from the solid state to the liquid state or to prevent ink evaporation. In any case, an ink which is liquified when heat energy is supplied in accordance with a recording signal so as to be discharged in the form of fluid ink, or an ink which is liquified only after heat energy is supplied, e.g., an ink which starts to solidify when it reaches a recording medium, can be adapted to the present invention. In the above-mentioned case, the ink may be of a type which is held as fluid or solid material in a recess of a porous sheet or a through hole at a position to face the electricity-to-heat converter as disclosed in Japanese Patent Laid-Open No. 54-56847 or Japanese Patent Laid-Open No. 60-71260. It is the most preferred way for the ink to be adapted to the aforesaid film boiling method.

As has been described above, according to the present invention, when one color filter is to be colored by a plurality of scanning operations, the ink discharging start positions are changed in the respective scanning operations to cause inks in the current scanning operation to land at positions different from the discharging positions of the inks in the preceding scanning operation. As a result, the inks uniformly spread in the respective pixels, and hence a color filter with very little color irregularity can be manufactured.

In the first scanning operation, of a plurality of scanning operations, inks are discharged at such intervals that the formed ink dots are partly joined to each other. This operation prevents inks discharged in the second scanning operation from being drawn to the inks discharged in the first scanning operation in an unbalanced manner, thereby manufacturing a color filter with very little color irregularity, in which color mixture between the adjacent pixels is prevented.

The present invention is not limited to the above embodiments and various changes and modifications can be made within the spirit and scope of the present invention. Therefore, to apprise the public of the scope of the present invention the following claims are made.

What is claimed is:

1. A method of manufacturing a color filter by coloring each filter element with a plurality of discharge inks, said method comprising the steps of:

relatively scanning an ink-jet head over a substrate in at least first and second scanning operations; and performing a coloring operation by changing discharging positions of inks onto respective filter elements in the first scanning operation with respect to the discharging positions of inks in the second scanning operation, wherein, in the first scanning operation, ink is discharged with predetermined spacing such that a plurality of inks applied on one filter element are partially joined to each other and form colored portions and non-colored portions on the one filter element, and in the second scanning operation, ink is further discharged between the plurality of ink discharging positions in the first scanning operation such that an area of the non-colored portions on the one filter element is decreased, and each filter element is filled with the plurality of inks discharged in the plurality of scanning operations.

2. The method according to claim 1, wherein the ink-jet head has a plurality of ink discharging nozzles arrayed in a direction inclined to the scanning direction with a predetermined angle, and a correspondence between the ink discharging nozzles and the respective pixels is changed in each of the plurality of scanning operations.

3. The method according to claim 1, wherein the ink-jet head is a head for discharging an ink by using heat energy, with the head having a heat energy generator for generating heat energy applied to the ink.

4. A method of manufacturing a color filter by discharging a plurality of inks from an ink-jet head and coloring each filter element on a substrate, said method comprising the steps of:

performing a plurality of relative scanning operations between the substrate and the ink-jet head; and coloring the filter element by setting ink applying positions in a first scanning operation different from ink applying positions in a second scanning operation subsequent to the first scanning operation, wherein, in the first scanning operation, first inks are discharged at a predetermined spacing such that non-colored portions which are not colored by the first inks remain on the filter element, and in the second scanning operation, second inks are discharged adjacent to each of the first inks, thereby reducing an area of the non-colored portions, and wherein, the relative scanning operation is repeated until the coloring of the filter element is completed.

5. A method of manufacturing an apparatus including a display device having a color filter manufactured by coloring each filter element with a plurality of discharge inks, said method comprising the steps of:

relatively scanning an ink-jet head over a substrate in at least first and second scanning operations;

manufacturing a color filter by changing discharging positions of inks onto respective filter elements in the first scanning operation with respect to the discharging positions of ink in the second scanning operation, wherein, in the first scanning operation, ink is discharged with predetermined spacing such that a plurality of ink dots, formed on the substrate with plural inks discharged on one filter element, are partially joined to each other and form colored portions on the filter element and non-colored portions on the filter element, and in the second scanning operation, ink is further discharged between the plurality of ink dots discharged with the first scanning operation such that an area of the non-colored portions on the filter element is decreased;

manufacturing the display device by unifying, with the color filter, light amount changing means for changing a light amount; and providing image signal supply means for supplying an image signal to the display device.

6. A method according to claim 5, wherein the light amount changing means comprises a liquid crystal compound.

7. A method of manufacturing a display device having a color filter manufactured by coloring each filter element with a plurality of discharge inks, said method comprising the steps of:

relatively scanning an ink-jet head over a substrate in at least first and second scanning operations;

manufacturing a color filter by changing discharging positions of inks onto respective filter elements in the first scanning operation with respect to the discharging positions of inks in the second scanning operation, wherein, in the first scanning operation, ink is discharged with predetermined spacing such that a plurality of ink dots, formed on the substrate with plural inks discharged on one filter element, are partially joined to each other and form colored portions on the filter element and non-colored portions on the filter element, and in the second scanning operation, ink is further discharged between the plurality of ink dots discharged in the first scanning operation such that an area of the non-ink colored portions is decreased; and unifying, with the color filter, light amount changing means for changing a light amount.

8. A method according to claim 7, wherein the light amount changing means comprises a liquid crystal compound.

* * * * *

UNITED STATES PATENT AND TRADEMARK OFFICE
CERTIFICATE OF CORRECTION

PATENT NO. : 6,500,485 B1 Page 1 of 1
DATED : December 31, 2002
INVENTOR(S) : Nobuhito Yamaguchi et al.

It is certified that error appears in the above-identified patent and that said Letters Patent is hereby corrected as shown below:

<u>Column 6,</u>
Line 3, "by i-" should read -- by --.

Signed and Sealed this

Twenty-fifth Day of November, 2003

JAMES E. ROGAN
*Director of the United States Patent and Trademark Office*